United States Patent
Hwacinski et al.

(10) Patent No.: US 11,151,518 B2
(45) Date of Patent: Oct. 19, 2021

(54) NATURAL LANGUAGE EVENT

(71) Applicant: Microsoft Technology Licensing, LLC, Redmond, WA (US)

(72) Inventors: Jaime J Hwacinski, Sammamish, WA (US); Cindy Kwan, Bellevue, WA (US); Eva Britta Ka Burlin, Redmond, WA (US); Shahil Soni, Seattle, WA (US); Ian Dwyer Curry, Seattle, WA (US); Teslim Abiodun Alabi, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 15/616,782

(22) Filed: Jun. 7, 2017

(65) Prior Publication Data

US 2018/0357609 A1    Dec. 13, 2018

(51) Int. Cl.
*G06Q 10/10* (2012.01)
*G06F 3/0481* (2013.01)
*G06F 3/0482* (2013.01)
*G06F 40/30* (2020.01)
*G06F 40/242* (2020.01)

(52) U.S. Cl.
CPC ....... *G06Q 10/1093* (2013.01); *G06F 3/0482* (2013.01); *G06F 3/04817* (2013.01); *G06F 40/242* (2020.01); *G06F 40/30* (2020.01)

(58) Field of Classification Search
CPC ............ G06Q 10/1093; G06F 3/04817; G06F 3/0482; G06F 17/2735; G06F 17/3896
See application file for complete search history.

(56) References Cited

U.S. PATENT DOCUMENTS

| | | | |
|---|---|---|---|
| 7,565,397 B2 | 7/2009 | Hodjat et al. | |
| 8,296,686 B1 * | 10/2012 | Tedesco | G16H 40/63 |
| | | | 715/865 |
| 9,424,247 B1 * | 8/2016 | Tomkins | G06F 17/2872 |
| 9,760,566 B2 * | 9/2017 | Heck | G06F 40/35 |
| 10,614,424 B1 * | 4/2020 | Malinowski | G06Q 10/1095 |
| 2008/0077888 A1 * | 3/2008 | Miksovsky | G06Q 10/109 |
| | | | 368/29 |
| 2009/0307268 A1 * | 12/2009 | Chappell | G06Q 10/109 |

(Continued)

OTHER PUBLICATIONS

"International Search Report and Written Opinion Issued in PCT Application No. PCT/US2018/031923", dated Aug. 3, 2018, 11 Pages.

(Continued)

*Primary Examiner* — Dino Kujundzic
(74) *Attorney, Agent, or Firm* — Schwegman Lundberg & Woessner, P.A.

(57) ABSTRACT

A server system suitable for generating calendar events based on guided hints is provided. The server system receives, from a device of a first user, an indication to create a calendar event. The server system derives, using natural language processing, guided hints for information for the calendar event, and causes presentation of the guided hints on a user interface displayed on the device of the first user. The server system receives the information in response to the guided hints presented on the device of the first user, and generates the calendar event based on the information.

20 Claims, 19 Drawing Sheets

(56) References Cited

U.S. PATENT DOCUMENTS

| | | | | |
|---|---|---|---|---|
| 2010/0017216 A1* | 1/2010 | Chakra | G06Q 10/1093 | 705/1.1 |
| 2010/0318398 A1* | 12/2010 | Brun | G06F 17/2775 | 705/7.18 |
| 2011/0004835 A1* | 1/2011 | Yanchar | G06F 3/04817 | 715/763 |
| 2011/0119628 A1* | 5/2011 | Carter | G06F 3/0482 | 715/812 |
| 2011/0184768 A1* | 7/2011 | Norton | G06Q 10/02 | 705/5 |
| 2011/0231409 A1* | 9/2011 | Dhara | H04L 65/403 | 707/748 |
| 2012/0016678 A1* | 1/2012 | Gruber | G06F 40/40 | 704/275 |
| 2012/0030194 A1* | 2/2012 | Jain | G06F 3/0481 | 707/722 |
| 2012/0143961 A1* | 6/2012 | Jonsson | G06Q 10/1093 | 709/206 |
| 2012/0253788 A1* | 10/2012 | Heck | G06F 17/279 | 704/9 |
| 2013/0297317 A1* | 11/2013 | Lee | H04M 1/72552 | 704/270.1 |
| 2014/0012574 A1* | 1/2014 | Pasupalak | G06F 16/243 | 704/235 |
| 2014/0052681 A1* | 2/2014 | Nitz | H04L 51/02 | 706/46 |
| 2014/0181219 A1* | 6/2014 | Wang | H04L 51/32 | 709/206 |
| 2014/0229560 A1* | 8/2014 | Gray | G06Q 10/1095 | 709/206 |
| 2014/0288990 A1* | 9/2014 | Moore | G06Q 10/1095 | 705/7.19 |
| 2014/0344745 A1 | 11/2014 | Possing et al. | | |
| 2014/0359464 A1* | 12/2014 | Possing | H04L 67/306 | 715/738 |
| 2015/0058425 A1* | 2/2015 | Nathan | H04L 65/4038 | 709/206 |
| 2015/0193819 A1* | 7/2015 | Chang | G06Q 10/1095 | 705/7.19 |
| 2015/0278199 A1* | 10/2015 | Hazen | G06F 17/28 | 704/9 |
| 2015/0347980 A1* | 12/2015 | White | G06Q 10/1095 | 705/7.19 |
| 2015/0347985 A1* | 12/2015 | Gross | G06Q 10/10 | 705/7.19 |
| 2016/0112362 A1 | 4/2016 | Perazzo et al. | | |
| 2016/0217124 A1 | 7/2016 | Sarikaya et al. | | |
| 2016/0330597 A1* | 11/2016 | Kalkounis | G06F 40/56 | |
| 2017/0132019 A1 | 5/2017 | Karashchuk et al. | | |
| 2017/0200129 A1* | 7/2017 | Garg | G06Q 10/1093 | |
| 2017/0201471 A1* | 7/2017 | Miklos | G06Q 10/00 | |
| 2018/0121881 A1* | 5/2018 | Kumar | G06F 3/04817 | |
| 2018/0144308 A1* | 5/2018 | Lips | G06Q 10/1095 | |
| 2018/0288211 A1* | 10/2018 | Kim | H04M 1/72552 | |
| 2018/0349489 A1* | 12/2018 | Toudji | G06F 17/28 | |

OTHER PUBLICATIONS

"Create & manage events", http://web.archive.org/web/20150922022638/https:/support.google.com/plus/answer/2673334?hl=en, Published on: Sep. 22, 2015, 2 pages.

Lofte, Leanna, "Horizon Calendar review: Check the weather at the location of your next appointment", http://www.imore.com/horizon-calendar-review-check-weather-location-your-next-appointment, Published on: Apr. 30, 2013, 4 pages.

"BusyCal iOS", https://support.busymac.com/help/70670-settings, Retrieved on: Mar. 22, 2017, 11 pages.

"Fantastical 2 for Mac—What's New in 2.2", https://www.youtube.com/watch?v=pXXYG-vJI-g, Published on: Mar. 30, 2016, 1 page.

Merron, Jeff, "Calendars 5 for iOS review: Better than Calendar on all your devices", http://www.macworld.com/article/2058701/calendars-5-for-ios-review-better-than-calendar-on-all-your-devices.html, Published on: Oct. 29, 2013, 4 pages.

Pash, Adam, "QuickCal Creates Accurate Calendar Events with Natural Language", http://lifehacker.com/5140242/quickcal-creates-accurate-calendar-events-with-natural-language, Published on: Jan. 27, 2009, 2 pages.

"Calendar in Outlook on the web for business", https://support.office.com/en-us/article/Calendar-in-Outlook-on-the-web-for-business-5219c457-d1fe-4c2f-9032-1a816b88e936?ui=en-US&rs=en-US&ad=US&fromAR=1, Retrieved on: Mar. 22, 2017, 11 pages.

"Office Action Issued in European Patent Application No. 18731239.2", dated Nov. 18, 2020, 7 Pages.

* cited by examiner

NATURAL LANGUAGE EVENT

TECHNICAL FIELD

The subject matter disclosed herein generally relates to machines configured to the technical field of special-purpose machines that facilitate calendaring events, including computerized variants of such special-purpose machines and improvements to such variants, and to the technologies by which such special-purpose machines become improved compared to other special-purpose machines that facilitate calendaring events. Specifically, the present disclosure addresses systems and methods that generate calendared events using natural language.

BACKGROUND

Conventionally, calendar applications require a user to enter specific information such as time, location, people, and topic within calendaring forms. This is a tedious task that may be prone to input errors. As such, many users avoid the use of such calendar applications. Instead, users may send themselves a note (e.g., an e-mail, a text message) or create an entry in a to-do list. However, notes and entries in to-do lists typically do not show up on a digital calendar (although in some instances, notes and entries may show up if treated as all day events), and therefore, cannot provide an accurate consolidated view of the user's agenda.

BRIEF DESCRIPTION OF THE DRAWINGS

Some embodiments are illustrated by way of example and not limitation in the figures of the accompanying drawings.

DETAILED DESCRIPTION

Figure 1:
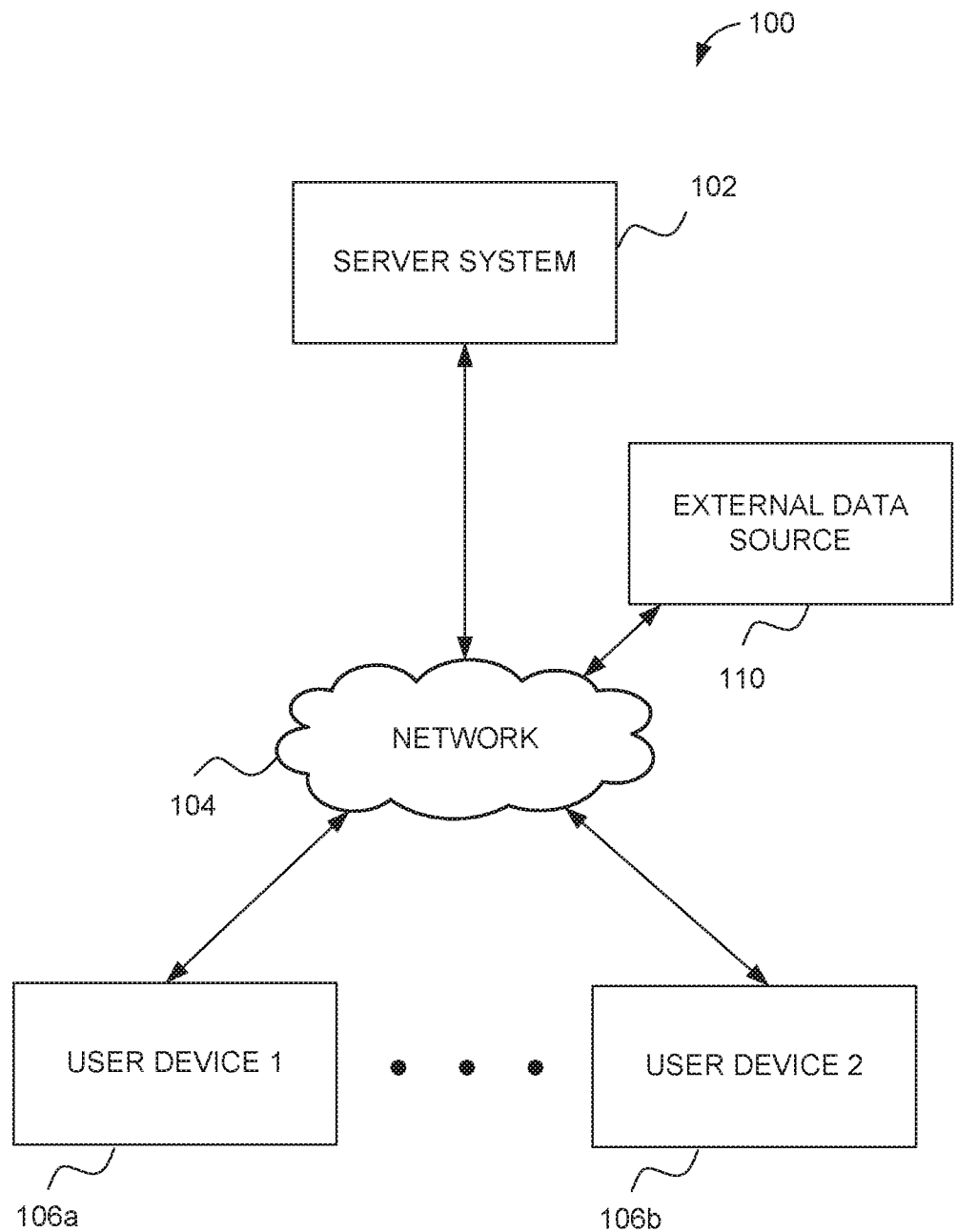
FIG. 1 is a block diagram illustrating an example environment for generating calendar events based on natural language processing.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) and systems (e.g., special-purpose machines) facilitate calendaring events based on natural language (NL) processing and using guided hints. Guided hints comprise prompts that are provided to the user in order to elicit details for a calendar event. Examples of guided hints include, but are not limited to, one or more categories or topics of events, a list of previous calendar events, a list of individuals (e.g., most frequent contacts, most recent contacts), a list of locations (e.g., most recently visited, preferred locations), and available dates and times. In particular, example embodiments provide mechanisms and logic that guide a user to provide as much information about an event as possible using natural language without the use of a full calendaring form. Accordingly, the mechanisms and logic receives, from a device of a first user, an indication to create a calendar event. The mechanisms and logic derives, using natural language processing, guided hints for information for the calendar event, and causes presentation of the guided hints on a user interface displayed on the device of the first user. The mechanisms and logic receives the information in response to the guided hints presented on the device of the first user, and generates the calendar event based on the information.

As a result, one or more of the methodologies described herein facilitate solving the technical problem of maintaining a consolidated view of a user's calendar by providing guided hints and use of natural language processing in order to generate calendar events that populate the user calendar (or agenda). As such, one or more of the methodologies described herein may obviate a need for certain efforts or resources that otherwise would be involved in users having to use conventional time-consuming calendaring forms or having notes in various different formats (e.g., email, text, to-do lists). As a result, resources used by one or more machines, databases, or devices (e.g., within the environment) may be reduced. Examples of such computing resources include processor cycles, network traffic, memory usage, data storage capacity, power consumption, network bandwidth, and cooling capacity.

FIG. 1 is a block diagram illustrating an example environment 100 for generating calendar events based on natural language processing and using guided hints. In example embodiments, a server system 102 comprises one or more servers configured to detect an entry of a calendar event by a user, determine and provide guided hints to elicit more information about the calendar event, and generate the calendar event (e.g., an entry in a calendar of the user) all without the use of a typical calendaring form. The server system 102 may be coupled via a network 104 to one or more user devices 106 (e.g., user device 1 106a and user device 2 106b). The server system 102 may also be coupled to one or more external data sources 110 that provide data to the server system 102 for inclusion in an analysis to determine the guided hints. The server system 102 will be discussed in more detail in connection with FIG. 2 below.

One or more portions of the network 104 may be an ad hoc network, an intranet, an extranet, a virtual private network (VPN), a local area network (LAN), a wireless LAN (WLAN), a wide area network (WAN), a wireless WAN (WWAN), metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

The user device 106 may comprise, but is not limited to, a smartphone, tablet, laptop, multi-processor system, microprocessor-based or programmable consumer electronics, game console, set-top box, or any other device that a user utilizes to communicate over the network 104. In example embodiments, the user device 106 may comprise a display module (not shown) to display information (e.g., in the form of user interfaces). In some embodiments, the user device 106 may comprise one or more of a touch screen, camera, keyboard, microphone, and Global Positioning System (GPS) device. The user device 106 may be a device of a user, which is used to receive and display information (e.g., via user interfaces).

In example embodiments, the external data source 110 provides additional information, over the network 104 to the server system 102 for use in deriving guided hints. In some embodiments, the external data source 110 comprises a search engine that tracks searches performed by the user. In other embodiments, the external data source 110 comprises a restaurant reservation system that provides availability information for reservations as well as information regarding locations (e.g., restaurants) including one or more of reviews, menus, contact information, and addresses. Further still, the external data source 110 may comprise other types of reservation/booking systems or rating systems (e.g., providing reviews or ratings on locations).

It is noted that the environment 100 shown in FIG. 1 is merely an example. For instance, any number and types of the external data sources 110 and user devices 106 may be embodied within the environment 100. Additionally, some components of the environment 100 may be combined. For example, some of the functions of the server system 102 may be embodied within the user device 106.

Any of the systems or machines (e.g., databases, devices, servers) shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 6, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Moreover, any two or more of the systems or machines illustrated in FIG. 1 may be combined into a single system or machine, and the functions described herein for any single system or machine may be subdivided among multiple systems or machines.

Figure 2:
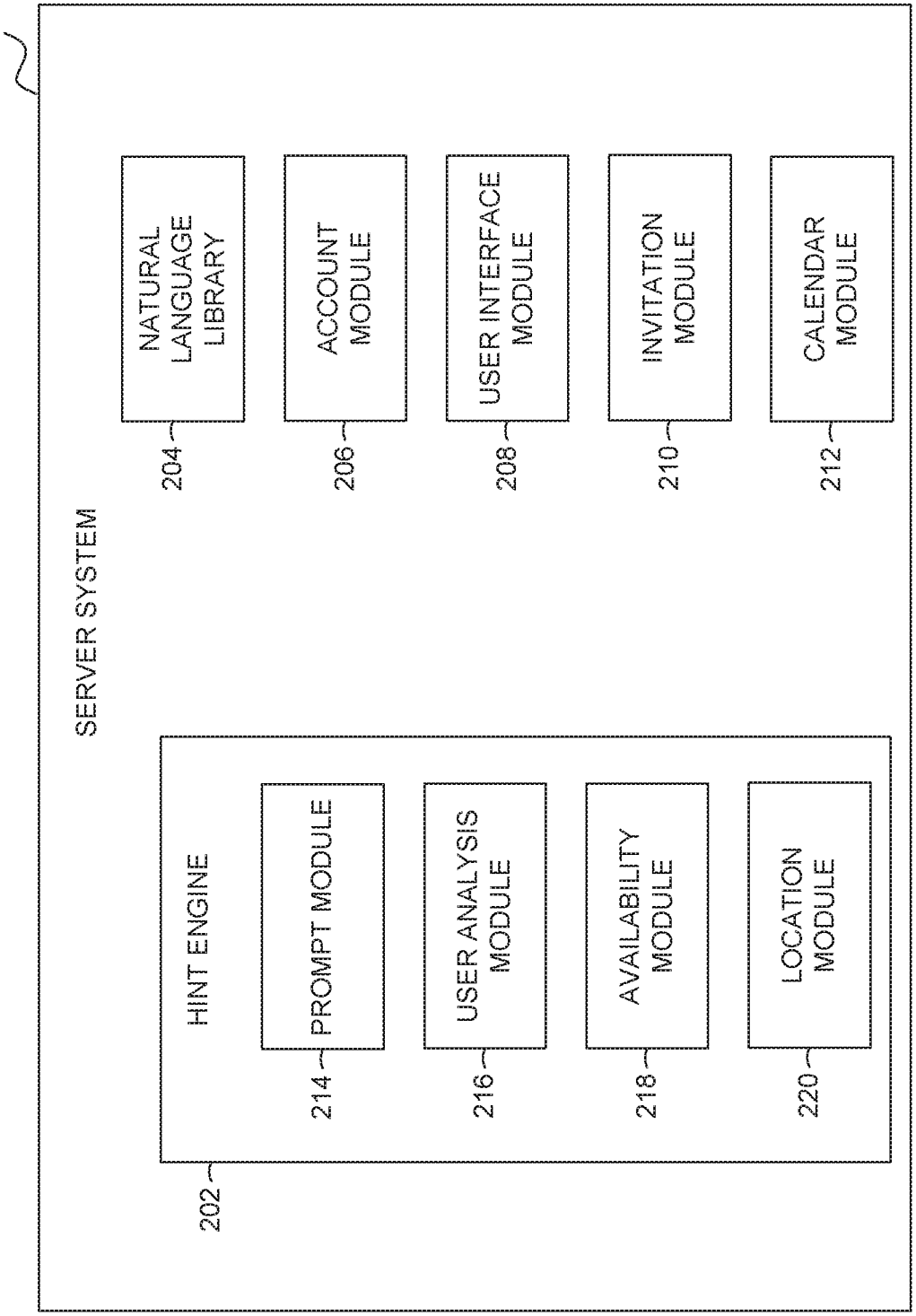
FIG. 2 is a block diagram illustrating an example embodiment of components within a server system in accordance with an example embodiment.

FIG. 2 is a block diagram illustrating an example embodiment of components within the server system 102 in accordance with an example embodiment. In example embodiments, the server system 102 performs operations to manage a calendar including detecting entry of a calendar event by a user, determining (e.g., using natural language processing) and providing guided hints to elicit more information about the calendar event, and generating the calendar event (e.g., an entry in the calendar of the user) without the use of a typical calendar form. To enable these operations, the server system 102 comprises a hint engine 202, a natural language library 204, an account module 206, a user interface (UI) module 208, an invitation module 210, and a calendar module 212 all of which are configured to communicate with each other (e.g., over a bus, shared memory, or a switch).

The natural language library 204 comprises definitions and a repository of queries and next probable points of input (e.g., guided hints) for the user. For example, if a user indicates that the calendar event is dinner, the natural language library 204 may link "dinner" with "at," "with," and "on" since a user may want to include a location (e.g., "at"), a dining partner (e.g., "with"), and a date (e.g., "on"). The suggestions (e.g., links) may change over time based on usage (e.g., what information do most people include for a particular topic or category). In some embodiments, the natural language library 204 is located elsewhere in the environment 100 and is communicatively coupled to the server system 102.

The account module 206 manages user accounts at the server system 102. In example embodiments, a user may log into a "universal" account with the server system 102 that includes access to, for example, an e-mail application (e.g., Outlook), an instant messaging application, a text messaging application, a search application (e.g. Bing), and a calendar application. User interaction with these applications may be monitored or tracked by the account module 206 and stored to a user account for each user. User account data can subsequently be used to determine, for example but not limited to, user preferences, list of most recent calendar events, list of most frequent contacts, preferred or most recently visited locations (e.g., restaurants, gyms, stores), and availability of a user.

The user interface (UI) module 208 is configured to cause presentation of user interfaces on the user devices 106. In example embodiments, the user interface module 208 generates and transmits instructions to the user devices 106 for rendering and display of the user interfaces. In other embodiments, the user interface module 208 may generate and present the user interfaces. The user interface module 208 may provide user interfaces for generating the calendar event including user interfaces that present the guided hints on the user device 106.

The invitation module 210 is configure to manage an invitation process at the server system 102. In example embodiments, the invitation module 210 receives an indication to invite a second user to an event that a first user is attempting (or has already) calendared. Accordingly, the invitation module 210 takes the information already gathered for the event and generates an invitation to the second user. In some embodiments, the invitation uses natural language. Assuming contact information for the second user is known, the invitation module 210 then sends the invitation to the second user using the contact information. The invitation may be sent, for example, via e-mail, text, or instant messaging. The invitation module 210 then monitors for a response, receives the response, and uses natural language processing to determine whether the response indicates acceptance of the invitation, decline of the invitation, or alternatives to the invitation.

The calendar module 212 generates the calendar event, which results in the calendar event being added to a calendar or agenda of the user. In some embodiments, the calendar event is generated in response to the user confirming the calendar event (e.g., selecting a "save" option). In other embodiments, the calendar event is generated in response to acceptance (as determined by the invitation module 210) of the invitation. Other triggers may be used to generate the calendar event.

The hint engine 202 is configured to derive guided hints for eliciting additional information for the calendar event. Accordingly, the hint engine 202 comprises a prompt module 214, a user analysis module 216, an availability module 218, and a location module 220 in accordance with one example embodiment. In example embodiments, the prompt module 214 accesses the natural language library 204 (e.g., accesses the definitions and a repository of queries and next probable points of input) based on an indication to create a calendar event or based on any input/information for the calendar event received from the user device 106. The prompt module 214 then determines hints such as categories, sub-categories, or natural language prompts (e.g., "at," "with," and "on"). For example, if the user selects a "coffee" category or starts to type "coffee," the prompt module 214, based on the natural language library, determines that the natural language prompts of "at," "with," and "on" should be suggested as guide hints. In contrast, if the user selects a "workout" category (or starts to type "workout"), the prompt module 214 may determine that the natural language prompts of "at" and "on" be suggested as guided hints, but "with" is not needed since individuals may workout alone. As more information is received from the user for the calendar event, less natural language, prompts may be provided. Further still, as more information is received for the calendar event, more specific hints may be provided (e.g., specific locations, specific locations with addresses, specific people).

The user analysis module 216 manages the analysis of user account data in determining hints. In example embodiments, the user analysis module 216 accesses user account data stored by or associated with the account module 206. The user account data is used by the user analysis module 216 to determine user specific hints such as suggested calendar events that are of a same topic/category as one or more of the previous calendar events (e.g., a list of most recent calendar events). Other user specific hints comprise, for example, a list of most frequent contacts or a list of preferred or most recently visited locations.

The availability module 218 manages the analysis of a user's availability for an event. In example embodiments, the user analysis module 216 accesses user account data (e.g., calendar information) stored by or associated with the account module 206. The user account data is used by the availability module 218 to determine where on the user's calendar a sufficient portion of time is free for the event. In some embodiments, the availability module 218 may use natural language processing and the natural language library to determine a particular timeframe that the event is typically scheduled and detect whether the user has availability during that timeframe. In other embodiments, the availability module 218 may access and use user account data to determine a user preferred timeframe for particular events. For example, a lunch event may have a timeframe between 11 am to 2 pm, while a dinner event may have a timeframe between 5 pm and 8 pm.

The location module 220 manages analysis of locations for the event. In some embodiments, the location module 220 may work with (or be replaced by) the user analysis module 216 to access user account data and determine preferred or most recently visited locations. In other embodiments, the location module 220 accesses the external data source 110 to obtaining external data used to generate the guided hints. In some cases, the external data comprises searches performed by the user, while in other embodiments, the external data comprises location availability information (e.g., for reservations) as well as information, such as, one or more of reviews, menus, contact information, and addresses. The location module 220 uses the external data to determine locations that the user may prefer, is located near the user, or that have availability for the type of event being generated (e.g., dinner, lunch). In some embodiments, the location module 220 works with the availability module 218 to determine locations that have availability that coincide with the availability of the user. In some embodiments, the location module 220 may even make a reservation on behalf of the user (e.g., in response to generating the calendar event).

Any one or more of the components (e.g., modules) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. The server system 102 may comprise other components not pertinent to example embodiments that are not shown or discussed. Further still, one or more of the components of the server system 102 may be located at the user device 106.

Figure 3A:
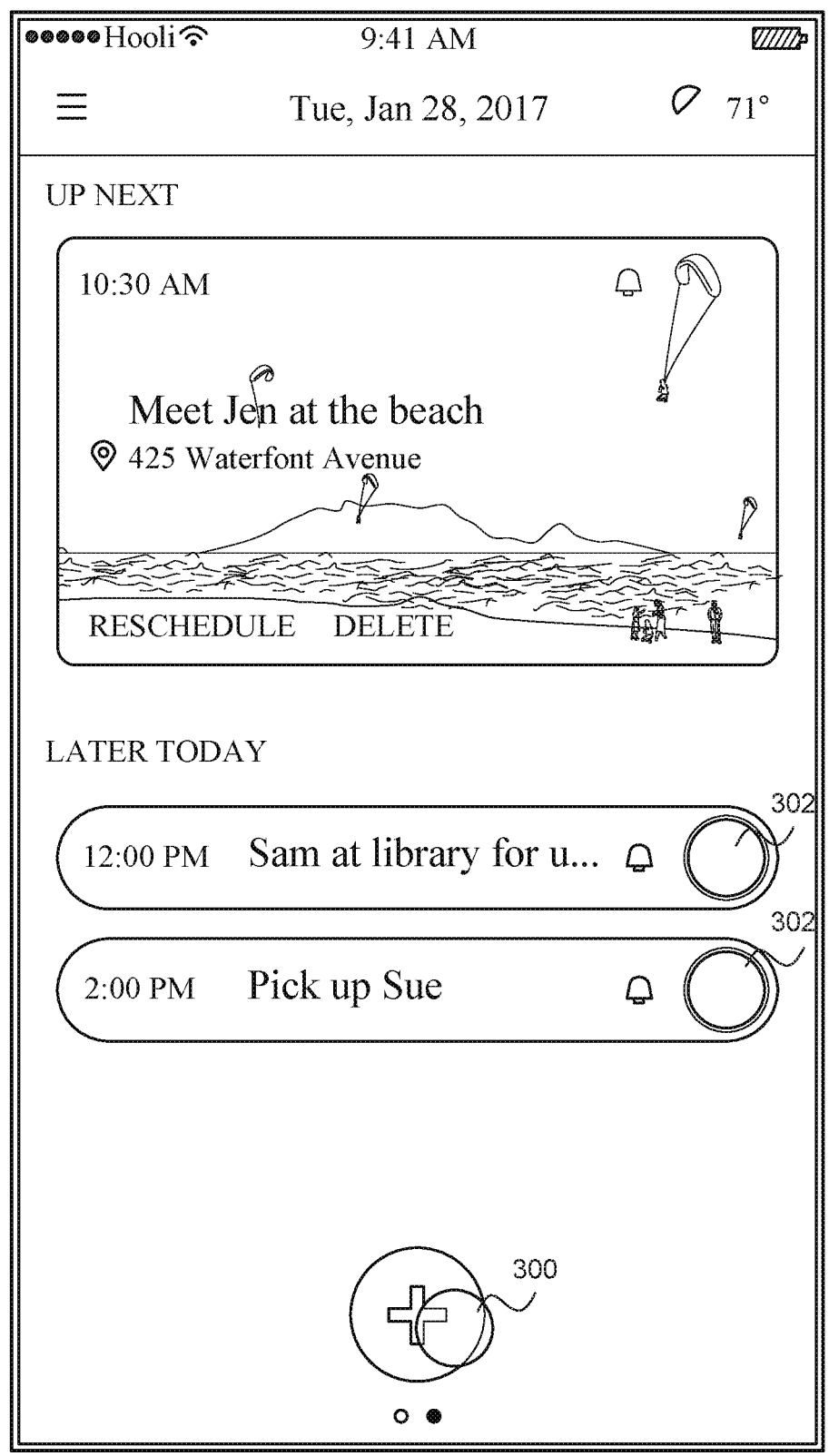
FIG. 3A-FIG. 3N illustrate user interfaces of an example flow for generating a calendar event based on natural language processing and using guided hints in accordance with example embodiments.
Figure 3B:
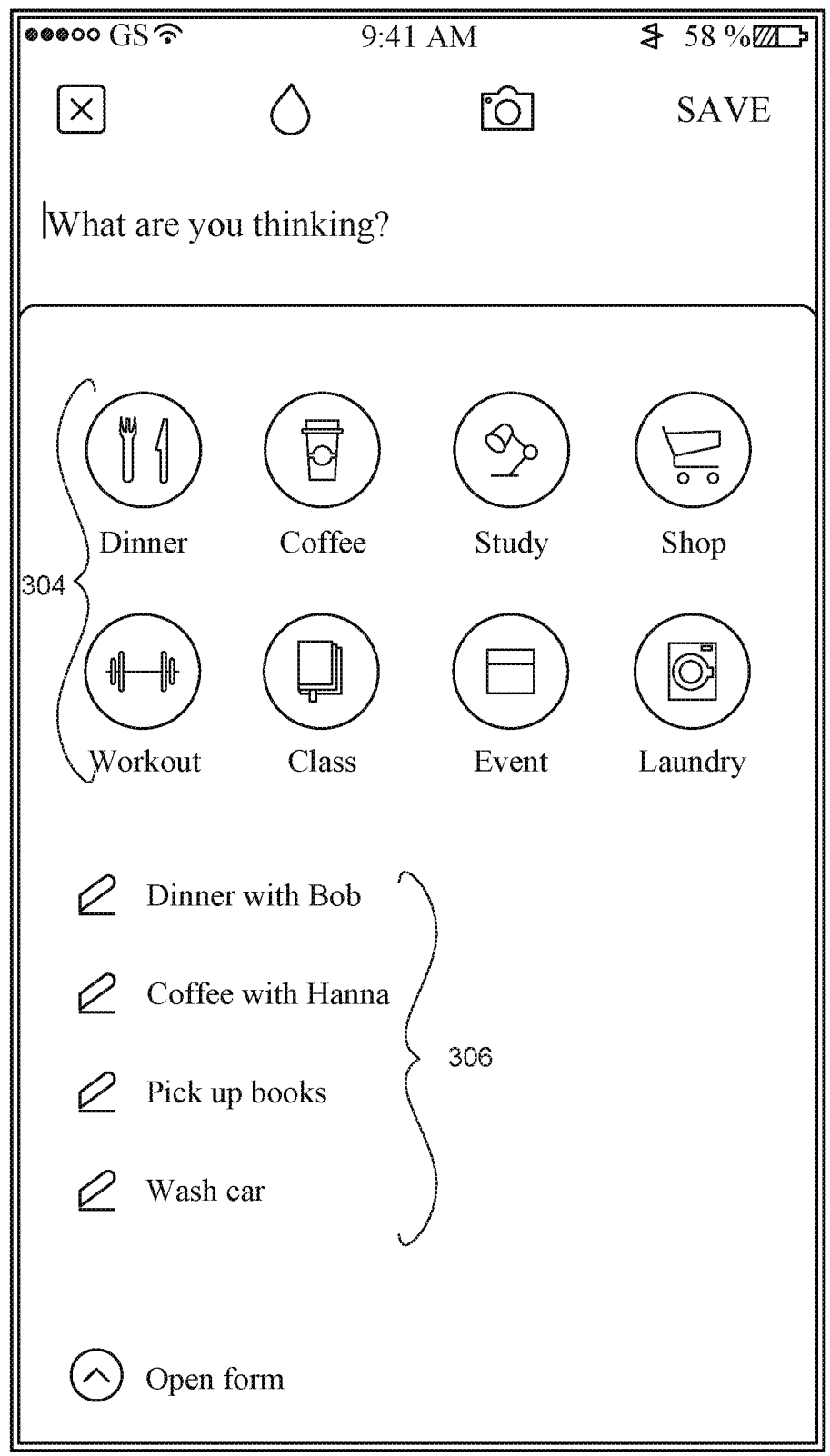
Figure 3C:
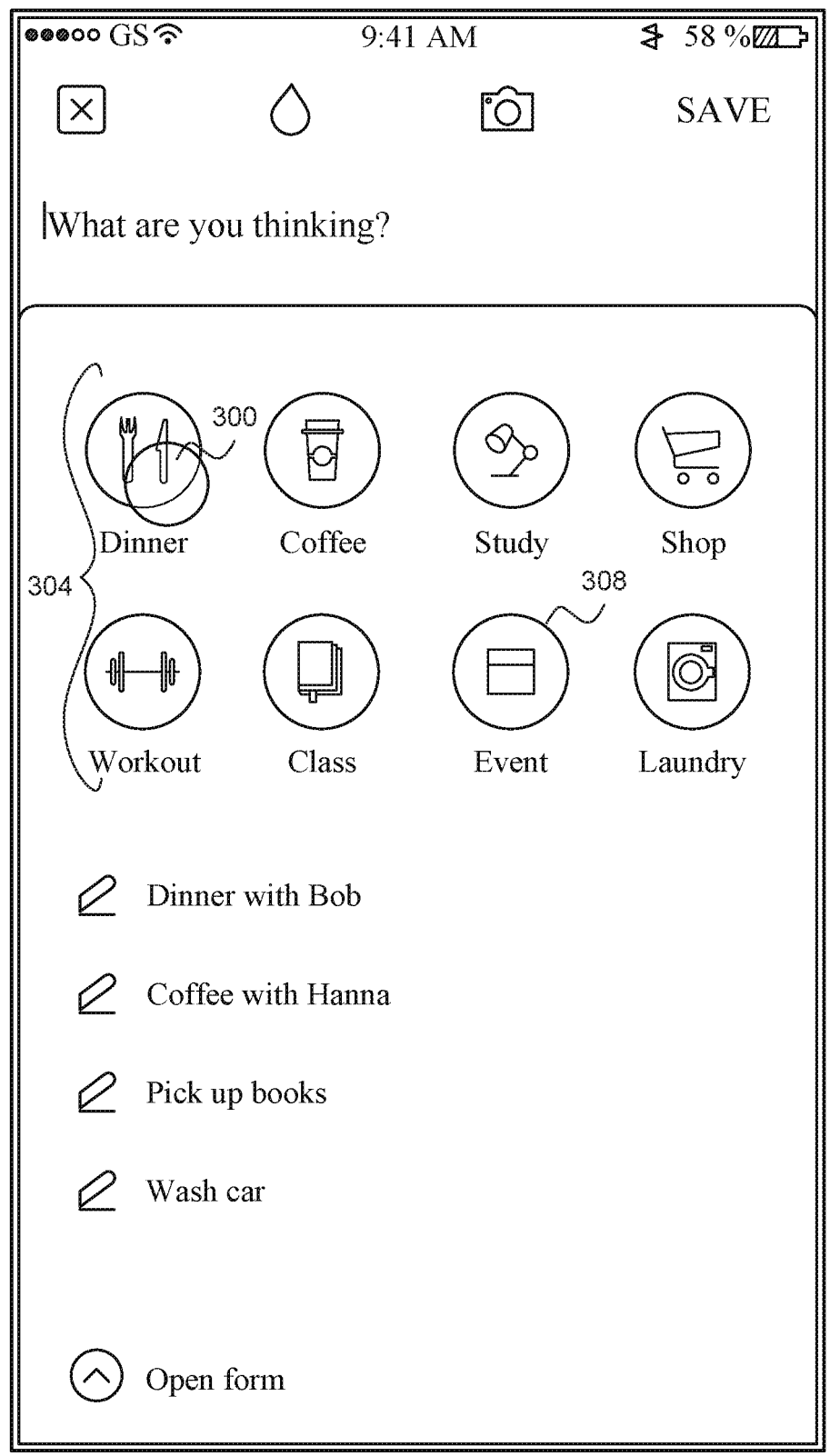
Figure 3D:
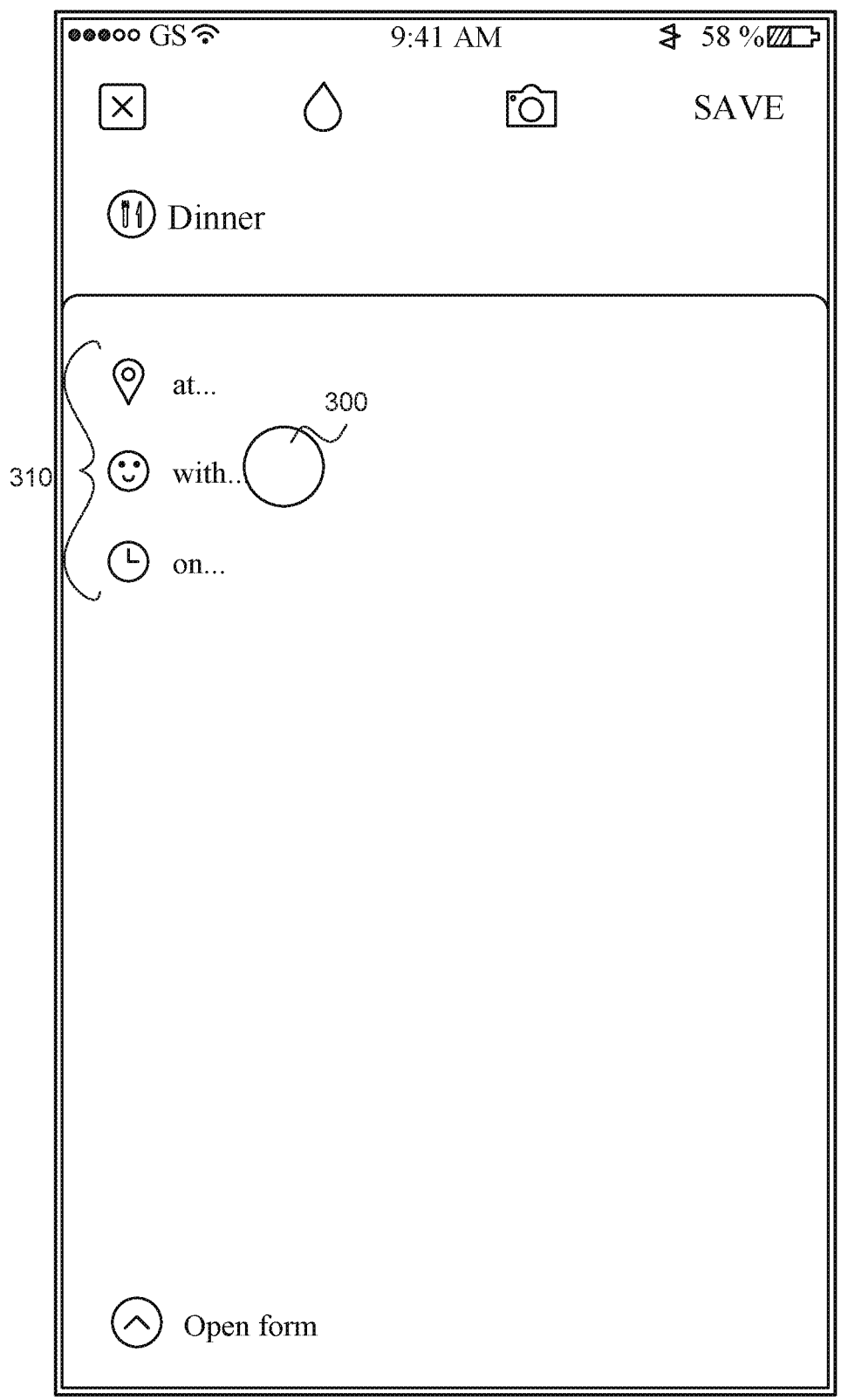
Figure 3E:
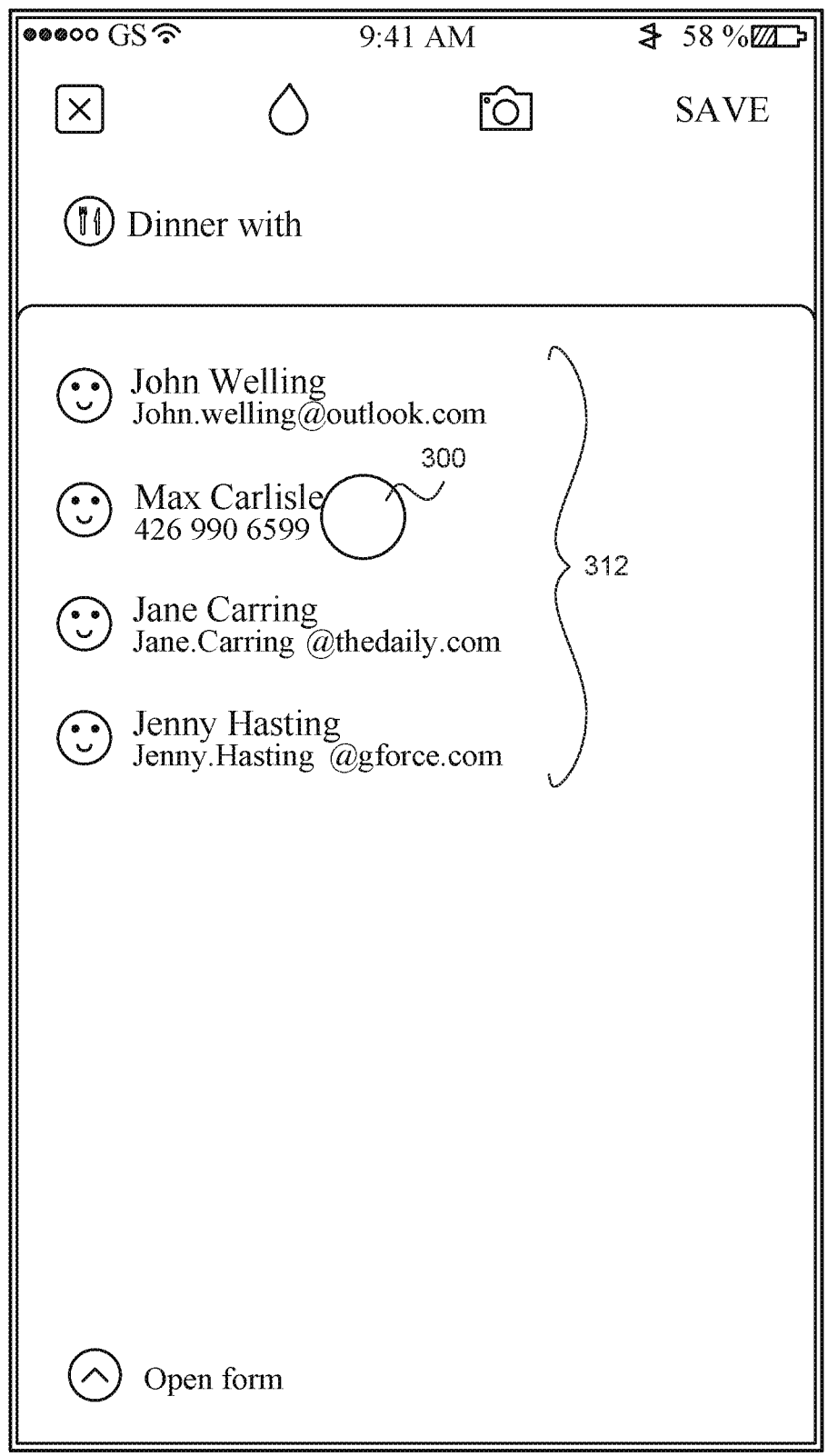
Figure 3F:
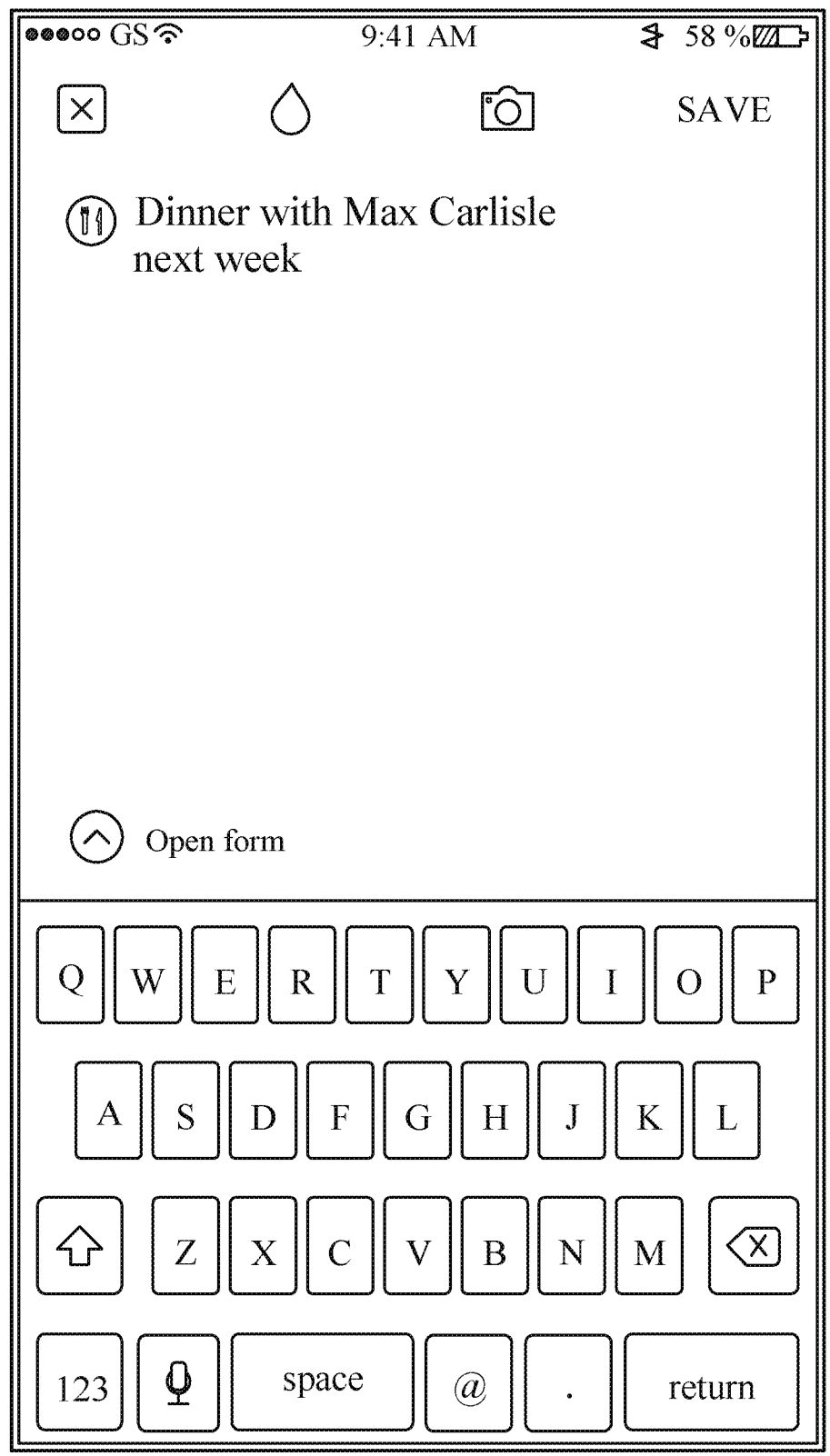
Figure 3G:
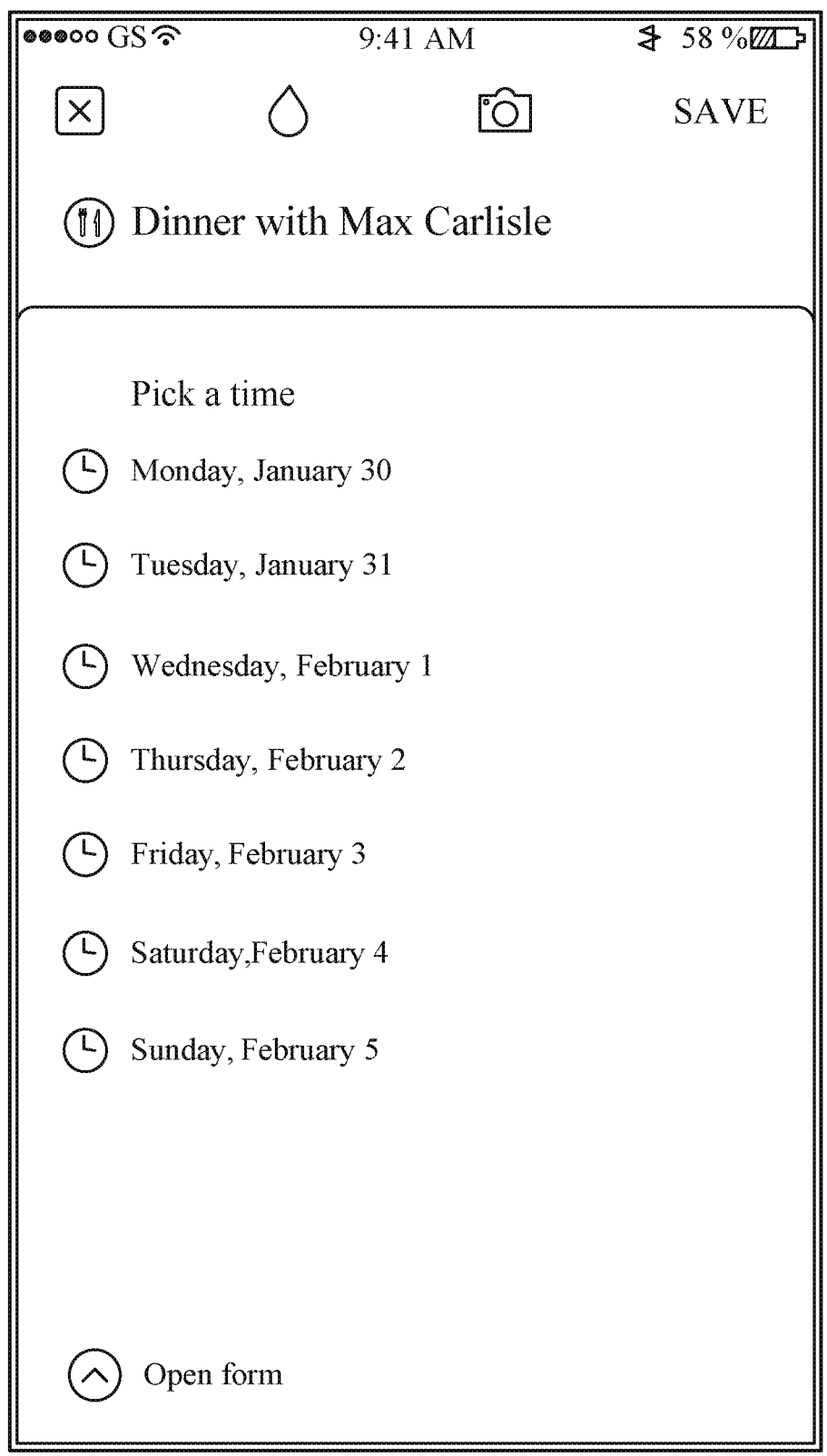
Figure 3H:
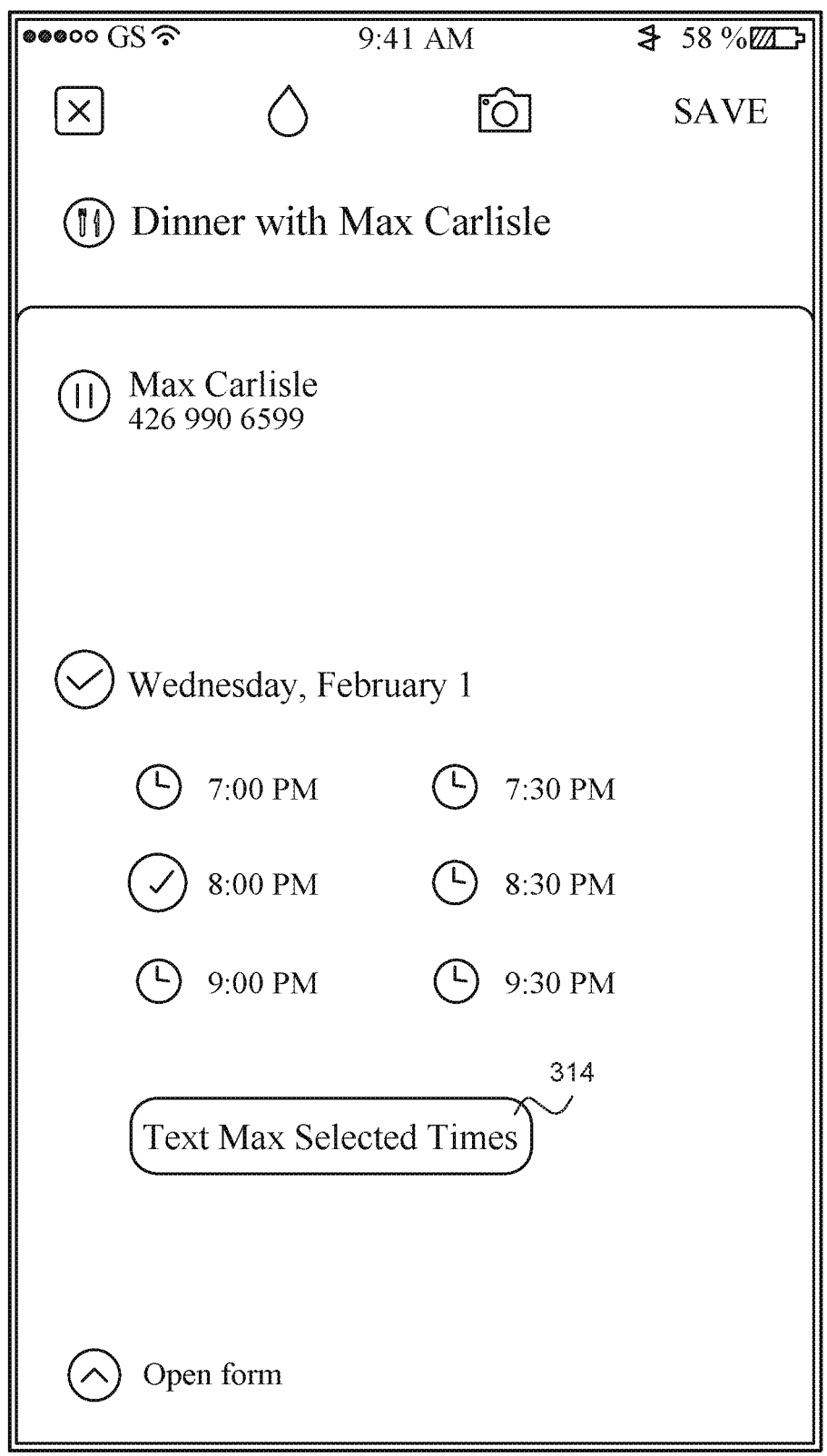
Figure 3I:
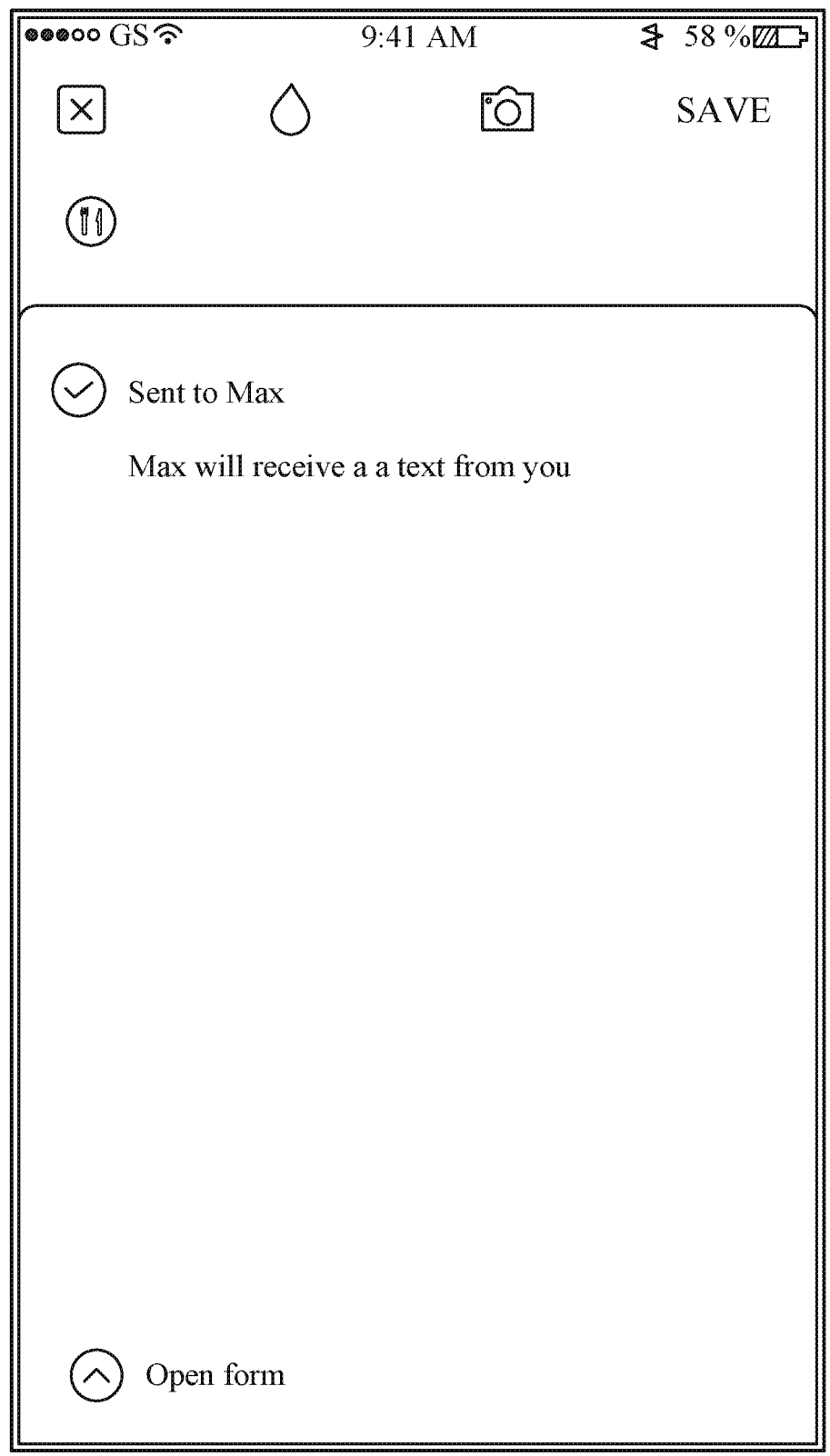
Figure 3J:
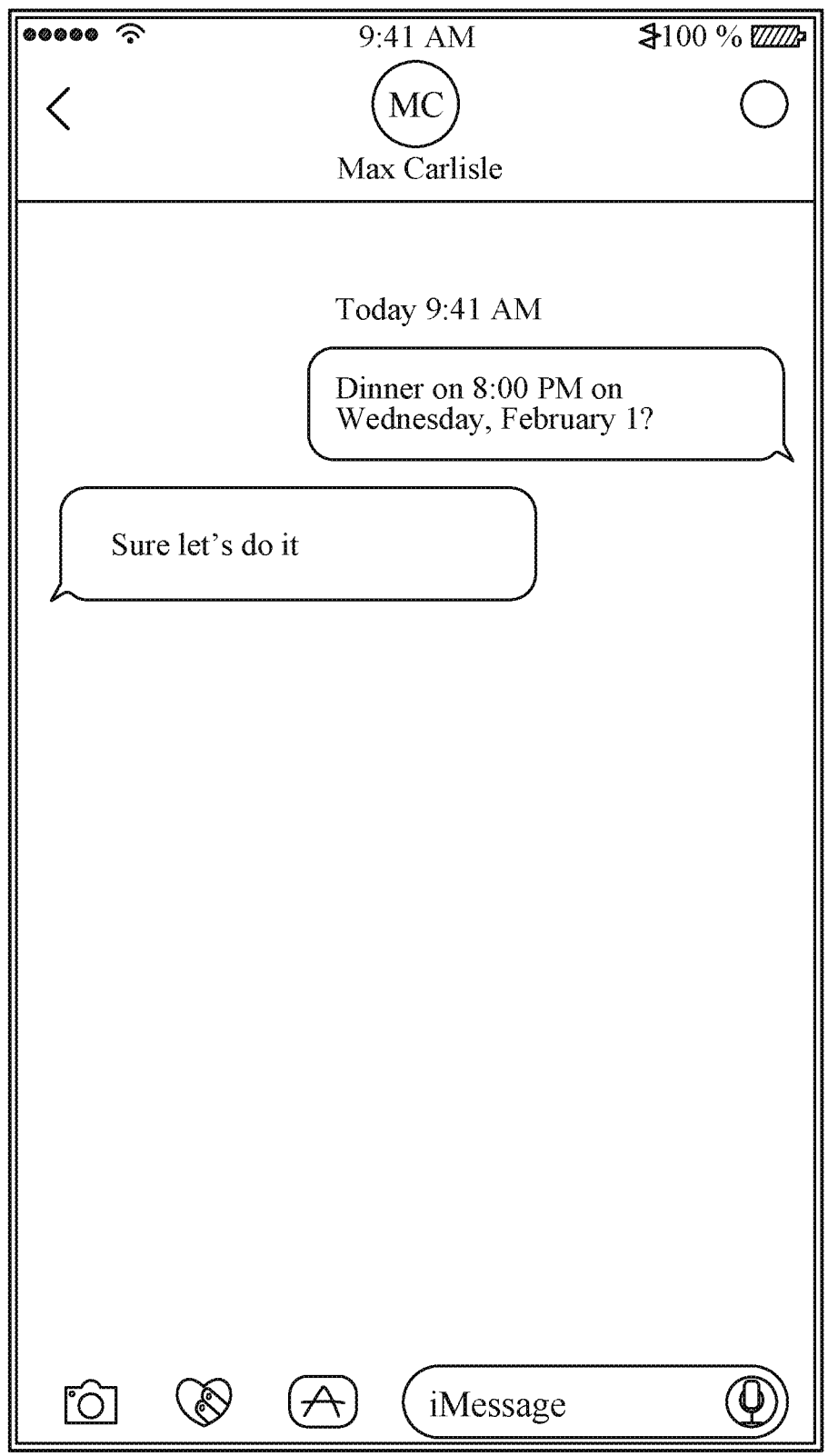
Figure 3K:
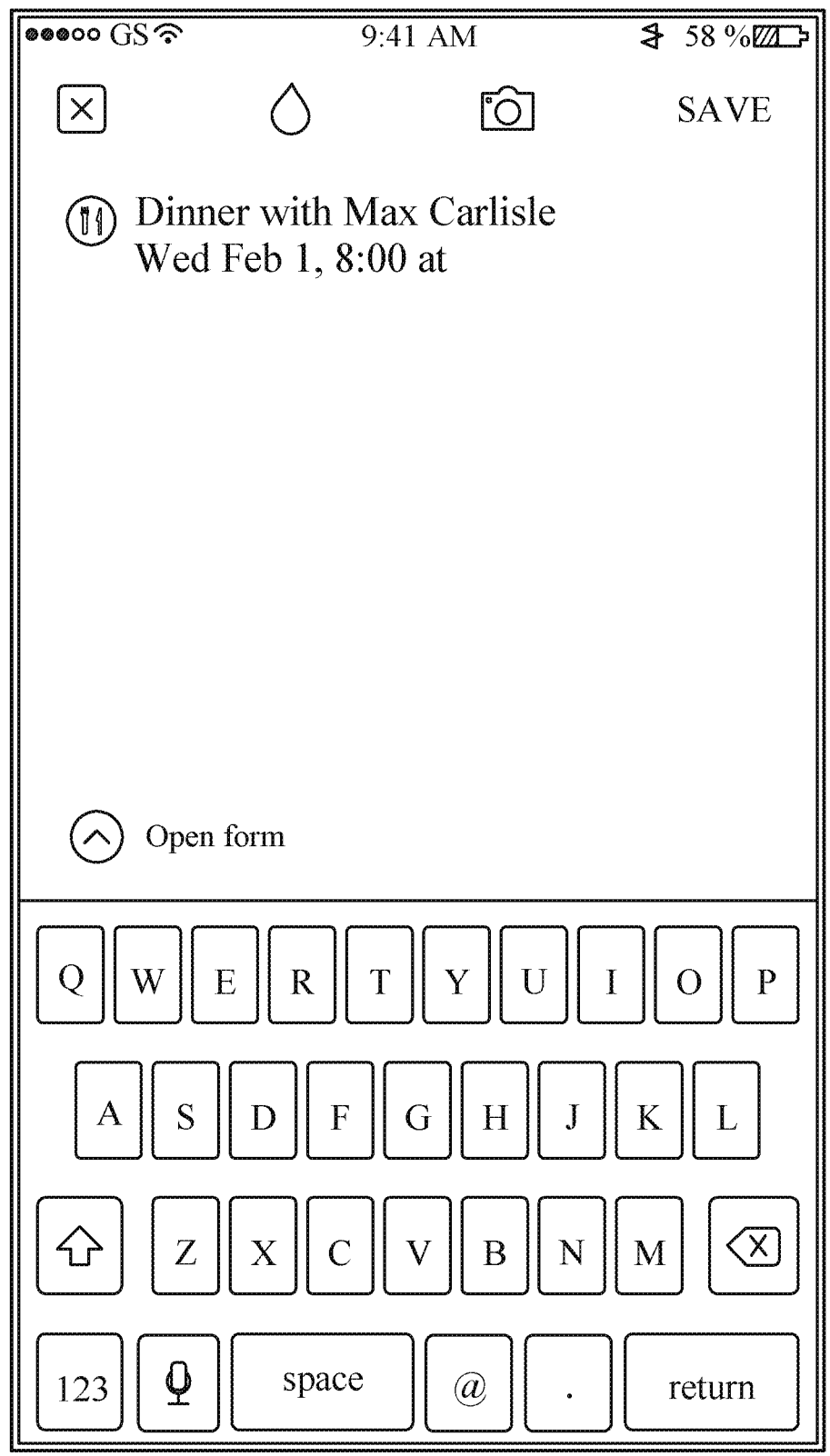
Figure 3L:
Figure 3M:
Figure 3N:
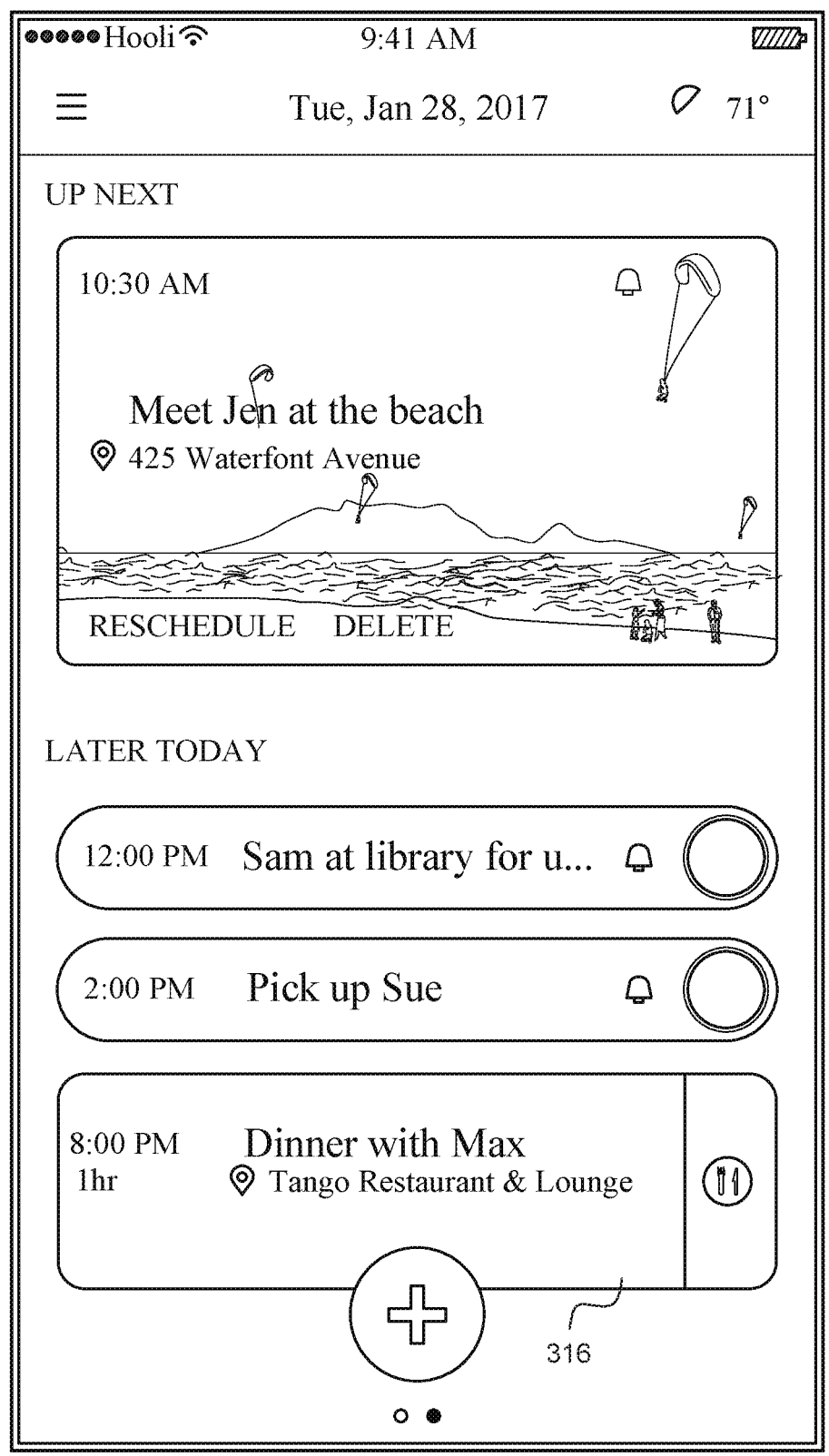

FIG. 3A-FIG. 3N illustrate user interfaces (UIs) of an example flow for generating a calendar event based on natural language processing and using guided hints in accordance with example embodiments. The UIs are rendered and displayed on the user device (e.g., user device 1 106a). While the example flow illustrates one sequence of user interfaces to generate the calendar event using natural language processing, the sequence of user interfaces can be performed in a different order, with different user selections or inputs, or without all of the user interfaces in accordance with alternative embodiments.

FIG. 3A illustrates an agenda UI. The agenda UI shows upcoming calendar events 302 for the user. The upcoming calendar events may be for a certain period of time (e.g., today, this week). In some cases, the agenda UI may be accessed from a calendar view (e.g., selecting a day from a displayed monthly calendar). In FIG. 3A, the user selects or taps the "+" icon (e.g., illustrated by the circle 300) to provide an indication to create a new calendar event. In an alternative embodiment, the user may just start typing (e.g., in natural language) a calendar event to indicate to the server system 102 to create the calendar event.

FIG. 3B illustrates a UI where a first set of guided hints (e.g., events the user most often sets up are shown). In particular, the guided hints include a list of icons 304 that indicate categories or topics that the user most often sets up. When first using example embodiments, the list of icons 304 may be a standard default list of icons. As the user uses the system more, the list of icons 304 become more customized for the user (e.g., dynamic and adaptive to user behavior). Alternatively, for the first few uses of example embodiments, the prompt module 214 may look at past usage in a calendar of the user to determine most often used categories or topics of events to determine customized icons. The UI also includes a list of previous calendar events 306 as guided hints. The list of previous calendar events 306 may be events that are most often set up by the user or the most recent events set up by the user (e.g., based on user account data of previous calendar events). As such, the user analysis module 216 may determine the lists of icons 304 and the list of previous calendar events 306. Any number of icons may be provided in the list of icons 304 and any number of previous calendar events 306 may be provided in the list of previous calendar events 306 as guided hints.

In FIG. 3C, the user selects an icon (e.g., selects a category or topic) from the list of icons 304 (e.g., the user selects the "dinner" icon or category as indicated by circle 300). In some embodiments, FIG. 3B may be the first UI the user interacts with and the selection of an icon from the list of icons 304 is the indication to create the calendar event.

If none of the specific icons on the list of icons 304 are appropriate, the user may select a generic "event" icon 308 or start typing an event. In embodiments, where the user starts typing, the server system 102 (e.g., the user analysis module 216) takes the letters or words the user is typing, determines calendar events (e.g., previous calendar events) that match the letters or words and suggests those in the list of previous events 306. Alternatively, the server system 102 (e.g., the prompt module 214) determines, using the natural language library 204, NL prompts based on words entered by the user. For example, if the user types "doctor's appointment," the keyword "appointment" triggers NL prompts such as "at," "with," and "on" (e.g., "appointment" is linked to "at," "with," and "on" in the natural language library 204). In another embodiment, the NL prompt may be a calendar for selection of a date or a series of time ranges for selection of a time. If the user types "doctor's appointment with," the prompt module 214 determines that an individual should be inputted (e.g., "with" indicates an individual), and the user analysis module 216 may determine a list of contacts to display to the user. Similarly, if the user types "doctor's appointment at," a series of locations may be determined by the location module 220 and presented (e.g., "at" indicates a location).

In response to the selection of the icon, a UI presenting natural language (NL) prompts 310 as guided hints is shown (FIG. 3D). In the present example and based on the category of "dinner," the NL prompts 310 are "at," "with," and "on."

The NL prompts 310 may differ based on the category selected and based on user preferences or past history. For example, the prompt module 214 may determine for the dinner category that the natural language library 204 links "dinner" with "at," "with," and "on" since the user may want to include a location (e.g., "at"), a dining partner (e.g., "with") and a date (e.g., "on"). The NL prompts 310 are suggestions or options to add more details (e.g., additional information) for the calendar event. In alternative embodiments, the selection of "dinner" in FIG. 3C may cause a list of previous calendar events that are dinners (e.g., previous calendar events of a same topic) to be presented in addition to, or as an alternative to, the NL prompts 310 shown on FIG. 3D. In another example, if the user selects an event from the list of previous calendar events 306 (e.g., Coffee with Hanna), the UI on FIG. 3D may be provided without the "with" NL prompt since the individual (e.g., invitee) is already indicated in the received information.

In FIG. 3D, the user selects the "with" prompt (as indicated by circle 300). In response, a list of contacts 312 is presented as guided hints as shown in FIG. 3E. The selection of the "with" prompt indicates a person, so the hint engine 202 (e.g., the user analysis module 216) determines a list of individuals to present. The list of contacts 312 may comprise a list of most frequent contacts such as individuals the user interacted with most recently (e.g., via e-mail or had a calendar event with) or just a list from a contact list (e.g., address book). If an individual that the user wants to include in the calendar event is not listed, the user may simply type the individual's name (e.g., tapping to type and entering the name).

In the present example, the user selects "Max Carlisle" (as indicated by circle 300). In response, the user interface model 208 may provide a UI that indicates "Dinner with Max Carlisle." In some embodiments, the calendar module 212 creates a calendar event that is "Dinner with Max Carlisle." The user may then add a time by typing "next week" to indicate a timeframe as shown in FIG. 3F. In an alternative embodiment, selection of an individual in FIG. 3E may cause a UI similar to FIG. 3D to be shown, but only have guided hints of "at" and "on" presented thereon.

Based on natural language processing, the server system 102 knows the user wants to enter a date and time based on the entry of "next week." Therefore, a UI providing days for the next week is presented as guided hints as shown in FIG. 3G. In some embodiments, only days that the user is available for the timeframe of the event (e.g., days where the user is available during dinner hours) are presented, or days the user is not available may be blocked out or indicated as not available. If the user did not indicate "next week" or if the user simply selects an "on" natural language prompt, the UI may provide a calendar view (e.g., a monthly calendar) from which the user selects a day.

In response to the user selecting a day, a UI presenting available times is presented as guided hints as shown in FIG. 3H. The times shown on the UI may be times the user is available (e.g., determined by the availability module 218), times various locations are available, or a combination of both. Natural language processing will indicate the time frame for the event (e.g., based on "dinner" only evening times shown). In example embodiments, the availability module 218 and/or the location module 220 may access the external data source 110 (e.g., restaurant application) and determine times available at various locations.

On FIG. 3H, an invite selection 314 is presented. Since the server system 102 has gathered enough details to generate the calendar event including an invitee and has contact information for the invitee, the server system 102 (e.g., the invitation module 210) provides an option to invite the invitee. In response to a selection of the invite selection 314, an invitation is electronically generated and transmitted to the invitee. Confirmation of the transmission of the invitation is provided as shown in FIG. 3I. The transmission may be by any electronic means. For example, if the server system 102 has a mobile number for the invitee, the message may be a text message. Alternatively, if the server system 102 has an e-mail address, the message may be transmitted as an e-mail or instant message.

In addition to the confirmation, the user may see, in this example, the text message on a text message UI presented by a text messaging application as shown in FIG. 3J. In the example, a response to the text message is received from the invitee. Based on natural language processing (e.g., processing "Sure let's do it" via use of the natural language library 204), the invitation module 210 determines that the invitee is accepting the invitation. The invitation module 210 may, for example, parse the response and detect "Sure." Using natural language processing, the invitation module 210 determine that "sure" indicates acceptance. In various embodiments, the response may, for example, indicate one or more of accept, decline, another day, another time, or another location.

In response to the acceptance, the calendar module 212 creates or updates the calendar event to indicate "Dinner with Max Carlisle on Wed Fed 1, 8 pm" as shown in FIG. 3K. At this point, the user can add a location by typing "at" (e.g., typing "at" after "Dinner with Max Carlisle on Wed Fed 1, 8 pm"). In response, a list of locations (e.g., restaurants) is presented as guided hints on the UI as shown in FIG. 3L. The list of locations may be based on the user's location (e.g., near the user) or a location between the user and the invitee (e.g., as determined by the location module 220). The list of locations can also be preferences based on user account data such as, for example, places the user has been to before (e.g., most recent location or most often location) or types of restaurants the user likes, or be based on external source data such as, for example, ratings, reviews, cost, and popularity. The list of locations may further be based on locations that have availability during the selected time.

The selection of the location (e.g., via the selection circle 300) creates or updates the calendar event to indicate "Dinner with Max Carlisle on Wed Fed 1, 8 pm at Tango Restaurant and Lounge" as shown in the UI of FIG. 3M. The UI may also present a map, address, and contact information for the location. A "save" selection saves the calendar event to the calendar (e.g., creates or updates the calendar event) and causes the calendar event to be visible on the agenda UI as shown in FIG. 3N. Selection of an entry 316 indicating the calendar event may present a calendar event UI similar to that shown in FIG. 3M. In some embodiments, the selection of the location (e.g., in FIG. 3L) may also cause a reservation at the selected location to be automatically made on behalf of the user.

Figure 4:
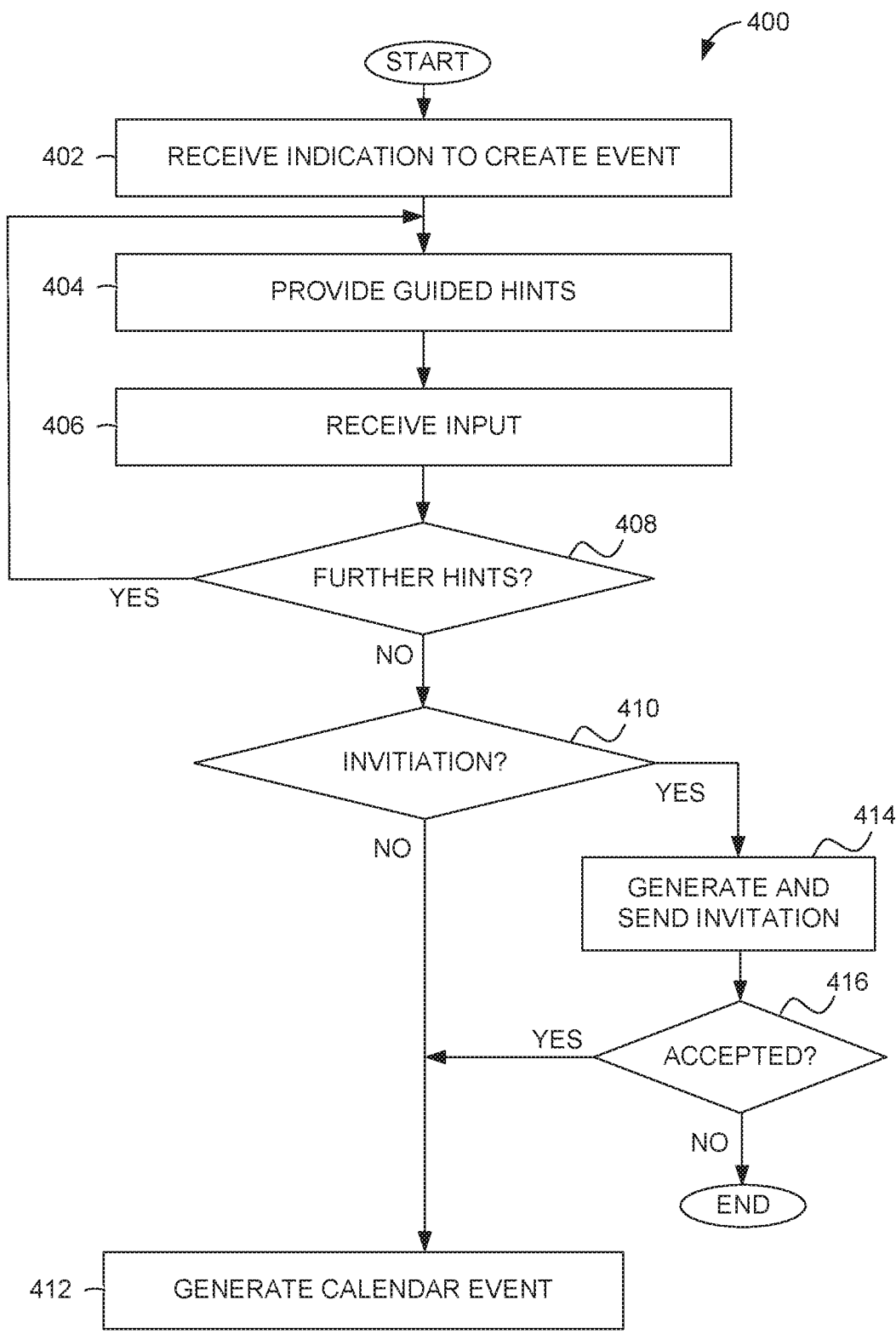
FIG. 4 is a flow diagram of a method 400 for generating a calendar event based on natural language processing and using guided hints in accordance with example embodiments.

FIG. 4 is a flow diagram of a method 400 for generating a calendar event based on natural language processing and using guided hints in accordance with example embodiments. Operations in the method 400 may be performed by the server system 102, using components (e.g., modules, engines) described above with respect to FIG. 2. Accordingly, the method 400 is described by way of example with reference to the server system 102. However, it shall be appreciated that at least some of the operations of the method 400 may be deployed on various other hardware configurations or be performed by similar components residing elsewhere. Therefore, the method 400 is not intended to be limited to the server system 102.

In operation 402, the server system 102 receives an indication to create an event from the device of the user. In some embodiments, the user selects or taps a "+" icon on a user interface to provide the indication to create the calendar event. In other embodiments, the user may just start typing (e.g., in natural language) information for the calendar event to indicate to the server system 102 to create the calendar event. Further still, the user can select a category (e.g., from a list of icons) to provide the indication to create the event.

In response to the indication to create the event, guided hints are provided in operation 404. The guided hints may comprise one or more of categories of events (e.g., list of icons), a list of previous calendar events of the user, or natural language prompts. Operation 404 will be discussed in more detail in connection with FIG. 5 below.

In operation 406, an input is received from the device of the user in response to the guided hints. The input comprises information (or additional information) for the calendar event. In some embodiments, the input comprises a selection of a guided hint (e.g., a category icon, a natural language prompt, a previous event to be repeated, an individual from a list of contacts, a location from a list of locations). In other embodiments, the input comprises text entered by the user on the device.

Based on the input, further guided hints may be provided. As such, in operation 408, a determination is made as to whether further guided hints should be provided. If further guided hints should be provided, then the method 400 returns to operation 404. However, is no further guided hints are to be provided, then a determination is made in operation 410 as to whether an invitation should be sent. In some embodiments, a determination to send an invitation is based on a selection of an invite selection by the user. Thus, in some embodiments, if no indication of an invite selection is received, no invitation is sent. In other embodiments, the invitation module 210 automatically sends an invitation to a second user or invitee if one is indicated in the calendar event. If an invitation is not to be sent, the calendar module 212 generates the calendar event and includes the calendar event in the calendar or agenda for the user. It is noted that the calendar event may be generated after any operation of the method 400 and receipt of any subsequent additional information updates the generated calendar event.

Returning to operation 410, if a determination is made to send the invitation, the invitation module 210 generates and send the invitation in operation 414. In example embodiments, the invitation module 210 takes the information already gathered for the event and generates the invitation to the second user. In some embodiments, the invitation uses natural language and provides details of the event. The invitation module 210 then sends the invitation to the second user (e.g., via e-mail, text, or instant messaging). The invitation module 210 then monitors for a response, receives the response, and uses natural language processing to determine whether the response indicates acceptance of the invitation in operation 416. If the invitation is accepted, the calendar event is generated (or updated) in operation 412. In some cases, the response may be a decline of the invitation or a suggestion of an alternative time or location.

Figure 5:
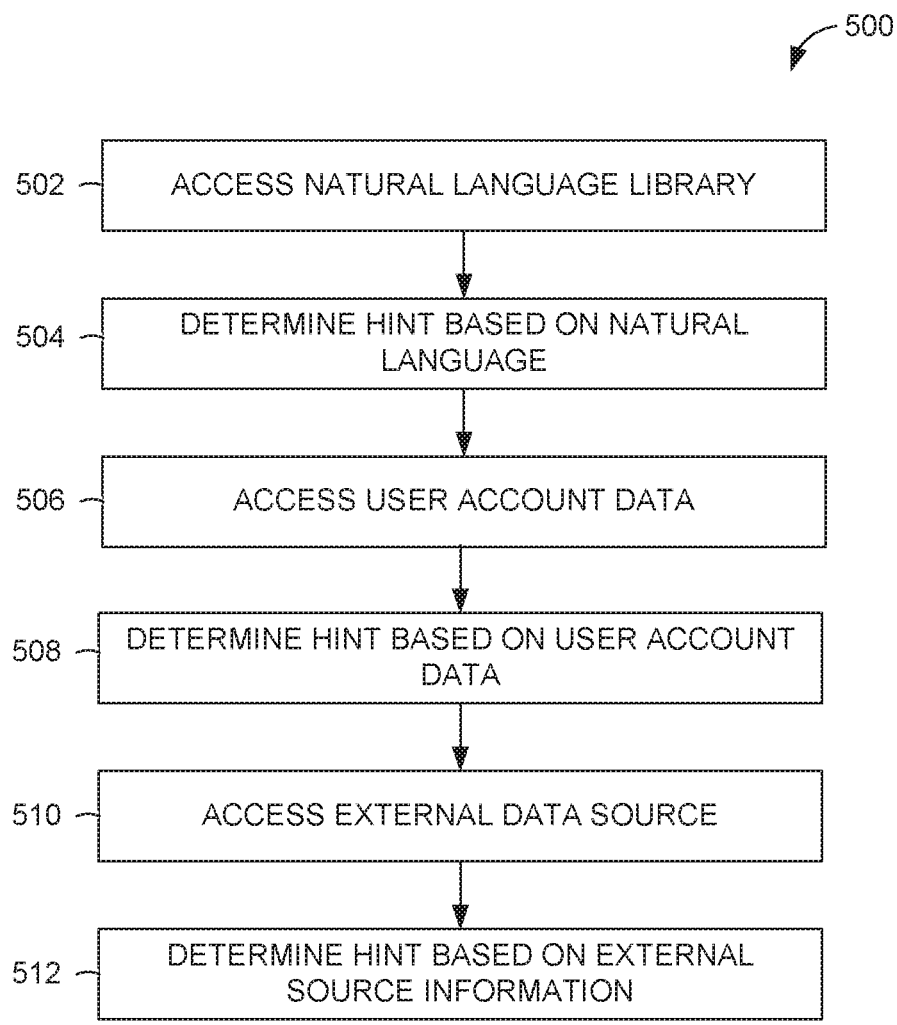
FIG. 5 is a flow diagram of a method for providing the guided hints for generating the calendar event in accordance with example embodiments.

FIG. 5 is a flow diagram of a method 500 (e.g., detailed operations of operation 404) for providing the guided hints for generating the calendar event in accordance with example embodiments. Operations in the method 500 may be performed by the server system 102, using components (e.g., modules, engines) described above with respect to FIG. 2. Accordingly, the method 500 is described by way of example with reference to the server system 102. However, it shall be appreciated that at least some of the operations of the method 500 may be deployed on various other hardware configurations or be performed by similar components residing elsewhere. Therefore, the method 500 is not intended to be limited to the server system 102.

In operation 502, the natural language library 204 is accessed by the hint engine 202 (e.g., the prompt module 214). The natural language library 204 comprises definitions and a repository of queries and next probable points of input. The prompt module 214 then determines guided hints based on the natural language library 204 in operation 504. The guided hints may comprise categories, sub-categories, or natural language prompts (e.g., "at," "with," and "on"). For example, if the user selects a "study" category or starts to type "study," the prompt module 214, based on the natural language library 204 determines that the natural language prompts of "at," "with," and "on" should be suggested as guided hints. As more information is received from the user for the calendar event, less natural language prompts may be provided.

In operation 506, the user analysis module 216 accesses user account data stored by or associated with the account module 206. The user account data is used by the user analysis module 216 to determine user specific guided hints in operation 508. The user specific guided hints are based on past history and user behavior of the user. For example, the user specific guided hints may comprise suggested calendar events that are a repeat of the previous calendar events (e.g., a list of most recent calendar events). Other user specific guided hints comprise, for example, a list of most frequent contacts or a list of preferred or most recently visited locations.

Operation 508 also includes the availability module 218 determining availability of the user based on the user's calendar. In some embodiments, the availability module 218 uses natural language processing and the natural language library 204 to determine a date and timeframe that the event is typically scheduled and detect whether the user has availability during that timeframe. In other embodiments, the availability module 218 accesses and uses user account data to determine a user preferred timeframe for particular events. For example, a lunch event may have a preferred timeframe between 11 am to 2 pm, while a dinner event may have a preferred timeframe during the evening.

In operation 510, one or more external data sources 110 are accessed. The external data source 110 provides additional information for use in deriving guided hints. In some embodiments, the external data source 110 comprises a search engine that tracks searches performed by the user. In other embodiments, the external data source 110 comprises a restaurant reservation system that provides availability information for reservations as well as information regarding locations (e.g., restaurants) including one or more of reviews, menus, contact information, and addresses.

In operation 512, the external data is used to derive guided hints. In some embodiments, the location module 220 uses the external data to determine locations that the user may prefer or that have availability for the type of event being generated (e.g., dinner, lunch, workout, shopping). In some embodiments, the location module 220 works with the availability module 218 to determine locations that have availability that coincide with the availability of the user (e.g., based on the user's calendar). The external data also provides ratings, reviews, costs, menus, contact information, or address that can be used to determine the list of locations to provide to the user as guided hints. The operations of the method 500 may be performed in a different order.

Figure 6:
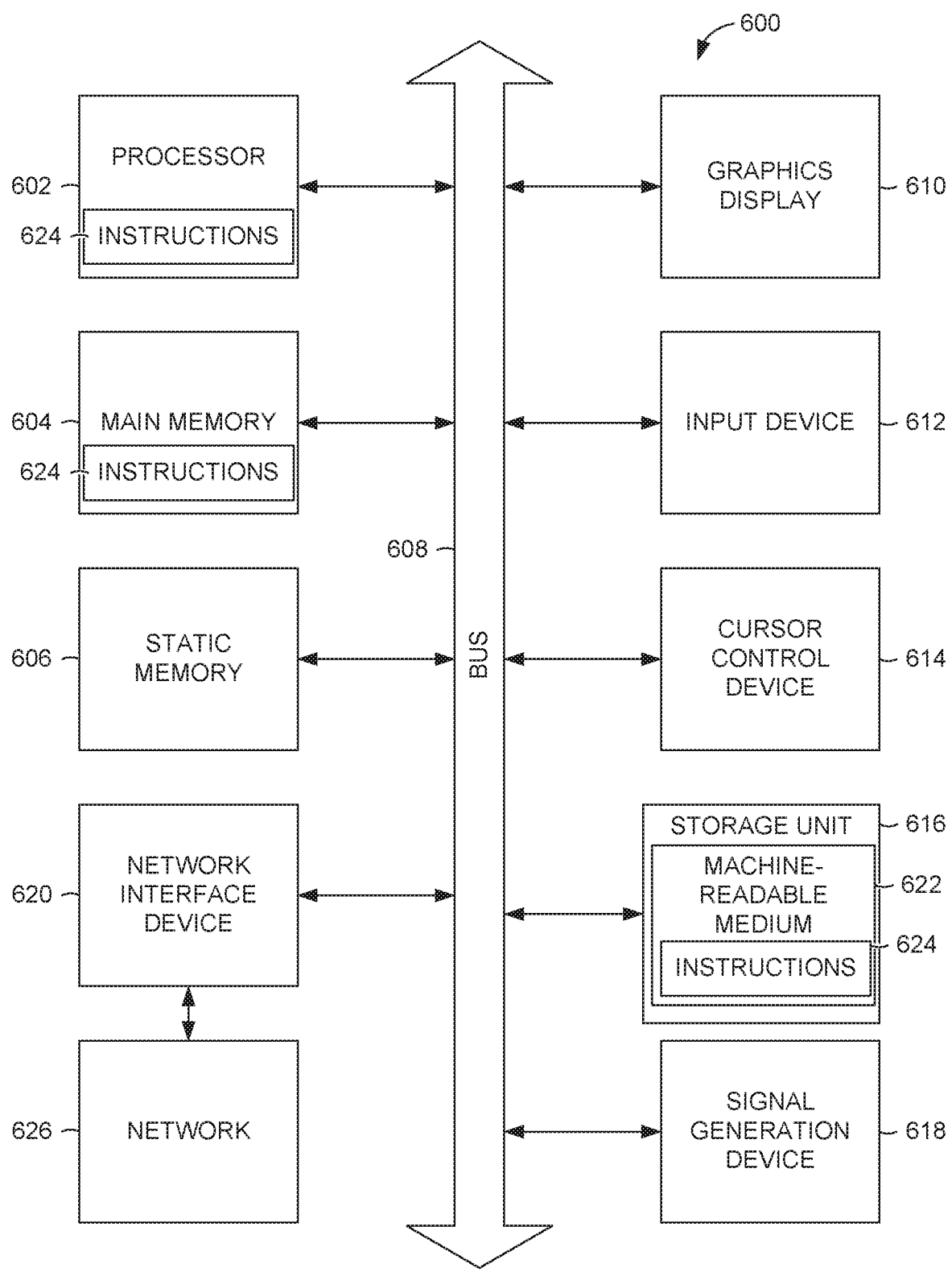
FIG. 6 is a diagrammatic representation of a machine in an example form of a computing system within which a set of instructions may be executed for causing the machine to perform any one or more of the methodologies discussed herein, according to an example embodiment.

FIG. 6 is a block diagram illustrating components of a machine 600, according to some example embodiments, able to read instructions 624 from a machine-storage medium 622 and perform any one or more of the methodologies discussed herein, in whole or in part. Specifically, FIG. 6 shows the machine 600 in the example form of a computer device (e.g., a computer) within which the instructions 624 (e.g., software, a program, an application, an applet, an app, or other executable code) for causing the machine 600 to perform any one or more of the methodologies discussed herein may be executed, in whole or in part.

For example, the instructions 624 may cause the machine 600 to execute the flows and flow diagrams of FIGS. 3-5. The instructions 624 can transform the general, non-programmed machine 600 into a particular machine (e.g., specially configured machine) programmed to carry out the described and illustrated functions in the manner described.

In alternative embodiments, the machine 600 operates as a standalone device or may be connected (e.g., networked) to other machines. The machine 600 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 600 capable of executing the instructions 624, sequentially or otherwise, that specify actions to be taken by that machine 600. Further, while only a single machine 600 is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (CPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The processor 602 may contain microcircuits that are configurable, temporarily or permanently, by some or all of the instructions 624 such that the processor 602 is configurable to perform any one or more of the methodologies described herein, in whole or in part. For example, a set of one or more microcircuits of the processor 602 may be configurable to execute one or more modules (e.g., software modules) described herein.

The machine 600 may further include a graphics display 610 (e.g., a plasma display panel (PDP), a light emitting diode (LED) display, a liquid crystal display (LCD), a projector, a cathode ray tube (CRT), or any other display capable of displaying graphics or video). The machine 600 may also include an alphanumeric input device 612 (e.g., a keyboard or keypad), a cursor control device 614 (e.g., a mouse, a touchpad, a trackball, a joystick, a motion sensor, an eye tracking device, or other pointing instrument), a storage unit 616, a signal generation device 618 (e.g., a sound card, an amplifier, a speaker, a headphone jack, or any suitable combination thereof), and a network interface device 620.

The storage unit 616 includes the machine-storage medium 622 on which are stored the instructions 624 embodying any one or more of the methodologies or functions described herein. The instructions 624 may also reside, completely or at east partially, within the main memory 604, within the processor 602 (e.g., within the processor's cache memory), or both, before or during execution thereof by the machine 600. Accordingly, the main memory 604 and the processor 602 may be considered machine-storage media 622 (e.g., tangible and non-transitory machine-readable media).

In some example embodiments, the machine 600 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 604, 606, and/or memory of the processor(s) 602) and/or storage unit 616 may store one or more sets of instructions and data structures (e.g., software) 624 embodying or utilized by any one or more of the methodologies or functions described herein. These instructions, when executed by processor(s) 602 cause various operations to implement the disclosed embodiments.

As used herein, the terms "machine-storage medium," "device-storage medium," "computer-storage medium" (referred to collectively as "machine-storage medium 622") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 622 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 622 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 624 may further be transmitted or received over a communications network 626 using a transmission medium via the network interface device 620 and utilizing any one of a number of well-known transfer protocols (e.g., HTTP). Examples of communication networks 626 include a local area network (LAN), a wide area network (WAN), the Internet, mobile telephone networks, plain old telephone service (POTS) networks, and wireless data networks (e.g., WiFi, LTE, and WiMAX networks). The term "transmission medium" or "signal medium" shall be taken to include any intangible medium that is capable of storing, encoding, or carrying instructions 624 for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium 622 or in a signal medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 602 or a group of processors 602) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

EXAMPLES

Example 1 is a method for maintaining a consolidate calendar from generated calendar events based on guided hints and natural language processing. The method comprises receiving, from a device of a first user, an indication to create a calendar event; deriving, by a hardware processor using natural language processing, guided hints for information for the calendar event; causing presentation of the guided hints in a user interface displayed on the device of the first user; receiving the information in response to at least one of the guided hints presented on the device of the first user; and generating the calendar event based on the information, the generating of the calendar event comprising adding the calendar event to a calendar of the first user.

In example 2, the subject matter of example 1 can optionally include generating an invitation for a second user, wherein the second user is indicated as an invitee for the calendar event; transmitting the invitation to a device of the second user; receiving a response to the invitation from the device of the second user; and determining whether the response is an acceptance of the invitation, the generating of the calendar event being in response to the acceptance of the invitation.

In example 3, the subject matter of examples 1-2 can optionally include wherein the response to the invitation is in a natural language format; and the determining whether the response is the acceptance comprises using natural language processing to detect whether the response in the natural language format is an acceptance of the invitation.

In example 4, the subject matter of examples 1-3 can optionally include wherein the indication to create the calendar event comprises a selection of a create event icon or a selection of a category for the calendar event.

In example 5, the subject matter of examples 1-4 can optionally include wherein the indication to create the calendar event comprises detection of entry of one or more text characters corresponding to the calendar event.

In example 6, the subject matter of examples 1-5 can optionally include wherein the deriving the guided hints further comprises: accessing user account data, the user account data including previous calendar events; and determining the guided hints from the accessed user account data, the guided hints including suggested calendar events having a same topic as one or more of the previous calendar events.

In example 7, the subject matter of examples 1-6 can optionally include wherein the deriving the guided hints further comprises accessing user account data, the user account data including a list of frequent contacts, wherein the guided hints include the list of frequent contacts.

In example 8, the subject matter of examples 1-7 can optionally include wherein the deriving the guided hints further comprises: accessing user account data, the user account data including calendar information for the first user; and determining the guided hints from the accessed user account data, the guided hints including available days and times based on the calendar information.

In example 9, the subject matter of examples 1-8 can optionally include wherein the deriving the guided hints further comprises: accessing an external data source, the external data source including locations and ratings; and determining the guided hints from the accessed external data source, the guided hints including a list of locations having availability that coincide with availability of the first user.

In example 10, the subject matter of examples 1-9 can optionally include wherein the deriving the guided hints comprises: accessing a natural language library; and using definitions, repository of queries, and next probable points of input from the natural language library to perform the natural language processing.

In example 11, the subject matter of examples 1-10 can optionally include, in response to receiving the information, deriving a next set of guided hints for additional information for the calendar event; and causing presentation of the next set of guided hints on the user interface displayed on the device of the first user.

Example 12 is a system for maintaining a consolidate calendar from generated calendar events based on guided hints and natural language processing. The system includes one or more processors and a storage medium storing instructions that, when executed by the one or more hardware processors, causes the one or more hardware processors to perform operations comprising: receiving, from a device of a first user, an indication to create a calendar event; deriving, using natural language processing, guided hints for information for the calendar event; causing presentation of the guided hints in a user interface displayed on the device of the first user; receiving the information in response to at least one of the guided hints presented on the device of the first user; and generating the calendar event based on the information, the generating of the calendar event comprising adding the calendar event to a calendar of the first user.

In example 13, the subject matter of example 12 can optionally include generating an invitation for a second user, wherein the second user is indicated as an invitee for the calendar event; transmitting the invitation to a device of the second user; receiving a response to the invitation from the device of the second user; and determining whether the response is an acceptance of the invitation, the generating of the calendar event being in response to the acceptance of the invitation.

In example 14, the subject matter of examples 12-13 can optionally include wherein the response to the invitation is in a natural language format; and the determining whether the response is the acceptance comprises using natural language processing to detect whether the response in the natural language format is an acceptance of the invitation.

In example 15, the subject matter of examples 12-14 can optionally include wherein the deriving the guided hints further comprises accessing user account data, the user account data including previous calendar events; and determining the guided hints from the accessed user account data, the guided hints including suggested calendar events having a same topic as one or more of the previous calendar events.

In example 16, the subject matter of examples 12-15 can optionally include wherein the deriving the guided hints further comprises accessing user account data, the user account data including a list of frequent contacts, wherein the guided hints include the list of frequent contacts.

In example 17, the subject matter of examples 12-16 can optionally include wherein the deriving the guided hints further comprises accessing user account data, the user account data including calendar information for the first user; and determining the guided hints from the accessed user account data, the guided hints including available days and times based on the calendar information.

In example 18, the subject matter of examples 12-17 can optionally include wherein the deriving the guided hints further comprises accessing an external data source, the external data source including locations and ratings; and determining the guided hints from the accessed external data source, the guided hints including a list of locations having availability that coincide with availability of the first user.

In example 19, the subject matter of examples 12-18 can optionally include wherein the deriving the guided hints comprises: accessing a natural language library; and using definitions, repository of queries, and next probable points of input from the natural language library to perform the natural language processing.

Example 20 is a machine-storage medium for maintaining a consolidate calendar from generated calendar events based on guided hints and natural language processing. The machine-storage medium configures one or more processors to perform operations comprising receiving, from a device of a first user, an indication to create a calendar event; deriving, using natural language processing, guided hints for information for the calendar event; causing presentation of the guided hints in a user interface displayed on the device of the first user; receiving the information in response to at least one of the guided hints presented on the device of the first user; and generating the calendar event based on the information, the generating of the calendar event comprising adding the calendar event to a calendar of the first user.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving, via a touchscreen of a mobile device of a first user, a first touch input of an icon that provides an indication to create a calendar event;
in response to receiving the first touch input of the icon, causing presentation of a first set of guided hints in a user interface displayed on the mobile device of the first user, the first set of guided hints indicating selectable categories or events the first user sets up most often;
receiving, via the touchscreen of the mobile device, a second touch input indicating a selection of a category or event from the first set of guided hints;
determining and presenting, based on the selected category or event and an accessed natural language library, a plurality of natural language prompts linked to the selected category or event, the plurality of natural language prompts being a second set of guided hints;
based on the selected guided hint and using the natural language library, determining a timeframe that the calendar event is typically scheduled;
determining, based on accessed calendar information for the first user, times the first user is available during the determined timeframe;
receiving, via the touchscreen of the mobile device, a third touch input indicating a selection of a natural language prompt from the plurality of natural language prompts;
in response to receiving the selection of the natural language prompt, determining and presenting a list of selectable details associated with the selected natural language prompt as a third set of guided hints;
receiving, via the touchscreen of the mobile device, a fourth touch input indicating a selection of a detail from the list of selectable details; and
based on the selection of the detail from the list of selectable details, generating the calendar event based on the selected detail, the generating of the calendar event comprising adding the calendar event as an entry in a calendar of the first user.

2. The method of claim 1, further comprising:
generating an invitation for a second user, wherein the second user is indicated as an invitee for the calendar event;
transmitting the invitation to a device of the second user;
receiving a response to the invitation from the device of the second user; and
determining whether the response is an acceptance of the invitation, the generating of the calendar event being in response to the acceptance of the invitation.

3. The method of claim 2, wherein:
the response to the invitation is in a natural language format; and
the determining whether the response is the acceptance comprises using natural language processing to detect whether the response in the natural language format is an acceptance of the invitation.

4. The method of claim 1, wherein the causing presentation of the plurality of natural language prompts linked to the selected category comprises causing presentation of a list of selectable natural language prompts including at least two of "at," "with," or "on."

5. The method of claim 1, further comprising:
tracking user interactions of the first user with a plurality of applications associated with a universal account of a server system, the plurality of applications including at least an e-mail application, a messaging application, and a calendar application; and
utilizing the tracked user interactions to determine guided hints including most frequent contacts, preferred or most recently visited locations, and availability of the first user.

6. The method of claim 1, further comprising deriving a plurality of guided hints from which the first set of guided hints is selected, the deriving comprising:
accessing user account data, the user account data including previous calendar events; and
determining the plurality of guided hints from the accessed user account data, the plurality of guided hints including suggested calendar events having a same topic as one or more of the previous calendar events.

7. The method of claim 1, further comprising deriving a plurality of guided hints from which the first set of guided hints is selected, the deriving comprising accessing user account data, the user account data including a list of most recent or most often set up previous calendar events, wherein the plurality of guided hints includes the list of most recent or most often set up previous calendar events.

8. The method of claim 1, wherein the presenting the third set of guided hints comprises presenting a list of the available times of the first user during the determined timeframe.

9. The method of claim 1, further comprising:
accessing an external data source, the external data source including locations and ratings;
determining a list of locations having availability that coincide with a selected time of the generated calendar event; and
making a reservation at a location on the list of locations on behalf of the user in response to a selection of the location.

10. The method of claim 1, wherein determining the plurality of natural language prompts comprises, based on the selected guided hint, using a repository of queries and next probable points of input corresponding to the selected guided hint from the natural language library to identify the plurality of natural language prompts.

11. The method of claim 1, further comprising:
in response to receiving the selection of the detail, deriving a next set of guided hints requesting an additional detail related to the selected detail; and
causing presentation of the next set of guided hints on the user interface displayed on the device of the first user.

12. A system comprising:
one or more hardware processors; and
a storage medium storing instructions that, when executed by the one or more hardware processors, causes the one or more hardware processors to perform operations comprising:

receiving, via a touchscreen of a mobile device of a first user, a first touch input of an icon that provides an indication to create a calendar event;

in response to receiving the first touch input of the icon, causing presentation of a first set of guided hints in a user interface displayed on the mobile device of the first user, the first set of guided hints indicating selectable categories or events the first user sets up most often;

receiving, via the touchscreen of the mobile device, a second touch input indicating a selection of a category or event from the first set of guided hints;

determining and presenting, based on the selected category or event and an accessed natural language library, a plurality of natural language prompts linked to the selected category or event, the plurality of natural language prompts being a second set of guided hints;

based on the selected guided hint and using the natural language library, determining a timeframe that the calendar event is typically scheduled;

determining, based on accessed calendar information for the first user, times the first user is available during the determined timeframe;

receiving, via the touchscreen of the mobile device, a third touch input indicating a selection of a natural language prompt from the plurality of natural language prompts;

in response to receiving the selection of the natural language prompt, determining and presenting a list of selectable details associated with the selected natural language prompt as a third set of guided hints;

receiving, via the touchscreen of the mobile device, a fourth touch input indicating a selection of a detail from the list of selectable details; and based on the selection of the detail from the list of selectable details, generating the calendar event based on the selected detail, the generating of the calendar event comprising adding the calendar event as an entry in a calendar of the first user.

13. The system of claim 12, wherein the operations further comprise:

generating an invitation for a second user, wherein the second user is indicated as an invitee for the calendar event;

transmitting the invitation to a device of the second user;

receiving a response to the invitation from the device of the second user; and determining whether the response is an acceptance of the invitation, the generating of the calendar event being in response to the acceptance of the invitation.

14. The system of claim 13, wherein:

the response to the invitation is in a natural language format; and the determining whether the response is the acceptance comprises using natural language processing to detect whether the response in the natural language format is an acceptance of the invitation.

15. The system of claim 12, wherein the operations further comprise deriving a plurality of guided hints from which the first set of guided hints is selected, the deriving comprising:

accessing user account data, the user account data including previous calendar events; and determining the plurality of guided hints from the accessed user account data, the plurality of guided hints including a list of most recent or most often set up previous calendar events.

16. The system of claim 12, wherein the operations further comprise:

tracking user interactions of the first user with a plurality of applications associated with a universal account of a server system, the plurality of applications including at least an e-mail application, a messaging application, and a calendar application; and utilizing the tracked user interactions to determine guided hints including most frequent contacts, preferred or most recently visited locations, and availability of the first user.

17. The system of claim 12, wherein the operations further comprise deriving a plurality of guided hints from which the first set of guided hints is selected, the deriving comprising:

accessing user account data, the user account data including calendar information for the first user; and determining the plurality of guided hints from the accessed user account data, the plurality of guided hints including available days and times based on the calendar information.

18. The system of claim 12, wherein the operations further comprise:

accessing an external data source, the external data source including locations and ratings;

determining a list of locations having availability that coincide with a selected time of the generated calendar event; and making a reservation at a location on the list of locations on behalf of the user in response to a selection of the location.

19. The system of claim 12, wherein determining the plurality of natural language prompts comprises, based on the selected guided hint, using a repository of queries and next probable points of input corresponding to the selected guided hint from the natural language library to identify the plurality of natural language prompts.

20. A machine-storage medium storing instructions that, when executed by one or more processors of a machine, cause the machine to perform operations comprising:

receiving, via a touchscreen of a mobile device of a first user, a first touch input of an icon that provides an indication to create a calendar event;

in response to receiving the first touch input of the icon, causing presentation of a first set of guided hints in a user interface displayed on the mobile device of the first user, the first set of guided hints indicating selectable categories or events the first user sets up most often;

receiving, via the touchscreen of the mobile device, a second touch input indicating a selection of a category or event from the first set of guided hints;

determining and presenting, based on the selected category or event and an accessed natural language library, a plurality of natural language prompts linked to the selected category or event, the plurality of natural language prompts being a second set of guided hints;

based on the selected guided hint and using the natural language library, determining a timeframe that the calendar event is typically scheduled;

determining, based on accessed calendar information for the first user, times the first user is available during the determined timeframe;

receiving, via the touchscreen of the mobile device, a third touch input indicating a selection of a natural language prompt from the plurality of natural language prompts;

in response to receiving the selection of the natural language prompt, determining and presenting a list of selectable details associated with the selected natural language prompt as a third set of guided hints;

receiving, via the touchscreen of the mobile device, a fourth touch input indicating a selection of a detail from the list of selectable details; and based on the selection of the detail from the list of selectable details, generating the calendar event based on the selected detail, the generating of the calendar event comprising adding the calendar event as an entry in a calendar of the first user.

\* \* \* \* \*